(12) United States Patent
Miller et al.

(10) Patent No.: US 12,544,384 B2
(45) Date of Patent: Feb. 10, 2026

(54) ANTIBIOTIC CONJUGATES

(71) Applicant: UNIVERSITY OF NOTRE DAME DU LAC, South Bend, IN (US)

(72) Inventors: Marvin J. Miller, Notre Dame, IN (US); Rui Liu, Notre Dame, IN (US); Patricia Miller, Notre Dame, IN (US); Sergei Vakulenko, Notre Dame, IN (US); Nichole K. Stewart, Notre Dame, IN (US); William Boggess, Jr., Notre Dame, IN (US)

(73) Assignee: UNIVERSITY OF NOTRE DAME DU LAC, South Bend, IN (US)

( * ) Notice: Subject to any disclaimer, the term of this patent is extended or adjusted under 35 U.S.C. 154(b) by 1164 days.

(21) Appl. No.: 17/054,054

(22) PCT Filed: Aug. 9, 2018

(86) PCT No.: PCT/US2018/046109
§ 371 (c)(1),
(2) Date: Nov. 9, 2020

(87) PCT Pub. No.: WO2019/216933
PCT Pub. Date: Nov. 14, 2019

(65) Prior Publication Data
US 2021/0277023 A1    Sep. 9, 2021

Related U.S. Application Data

(60) Provisional application No. 62/668,969, filed on May 9, 2018.

(51) Int. Cl.
*A61K 31/546* (2006.01)
*A61P 31/04* (2006.01)
*C07D 501/16* (2006.01)

(52) U.S. Cl.
CPC ............ *A61K 31/546* (2013.01); *A61P 31/04* (2018.01); *C07D 501/16* (2013.01)

(58) Field of Classification Search
CPC ...... C07D 501/60; A61P 31/04; A61K 31/546
See application file for complete search history.

(56) References Cited

U.S. PATENT DOCUMENTS 11,014,891 B2 * 5/2021 Miller ................ C07D 265/26
2013/0281424 A1   10/2013 Miller et al.

FOREIGN PATENT DOCUMENTS

WO    2016/027262 A1    2/2016

OTHER PUBLICATIONS

Liu et al., Journal of Medicinal Chemistry 2018, vol. 61, pp. 3845-3854. (Year: 2018).*
Ito et al., Antimicrobial Agents and Chemotherapy 2016, vol. 60 (12), pp. 7396-7401. (Year: 2016).*
(Continued)

*Primary Examiner* — Rayna Rodriguez
*Assistant Examiner* — Janet L Coppins
(74) *Attorney, Agent, or Firm* — Troutman Pepper Locke LLP (Rochester)

(57) ABSTRACT

Provided are antibiotic conjugate compounds of formula (I) and pharmaceutical compositions thereof. Also provided are methods of treating treat bacterial infection, including infections caused by Gram-negative bacteria, by administering compounds of formula (I).

28 Claims, 5 Drawing Sheets

(56) References Cited

OTHER PUBLICATIONS

Mollmann et al., BioMetals 1998, 11, pp. 1-12. (Year: 1998).*
International Preliminary Report on Patentability for Application No. PCT/US2018/046109 (issued Nov. 10, 2020).
International Search Report and Written Opinion for Application No. PCT/US2018/046109 (mailed Sep. 28, 2018).
Ghosh et al., "Targeted Antibiotic Delivery: Selective Siderophore Conjugation with Daptomycin Confers Potent Activity Against Multidrug Resistant Acinetobacter baumannii Both in Vitro and in Vivo," Journal of Medicinal Chemistry 60:4577-4583 (2017).

* cited by examiner

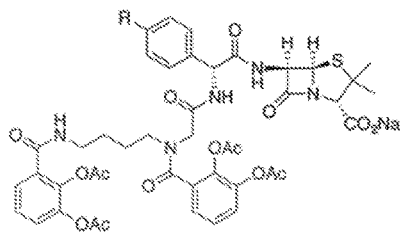
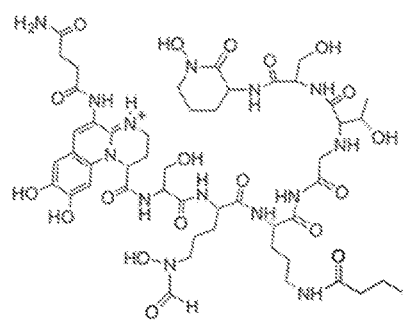

4, R = H (ampicillin conjugate)
5, R = OH (amoxicillin conjugate)
MICs = 0.02-0.16 vs various strains of *Pseudomonas aeruginosa*

6, PvD II - ampicillin conjugate
MIC (*P. aeruginosa* ATCC 27583) = 0.024 μM
MIC [(*P. aeruginosa* ATCC 156902, (PA01)] = >100 μM

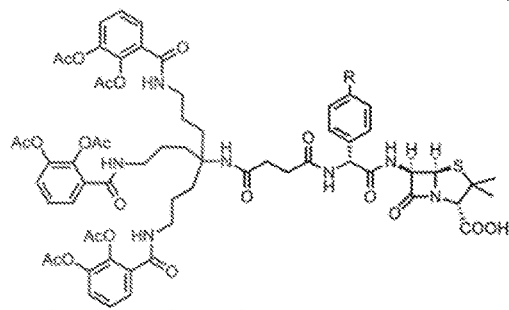
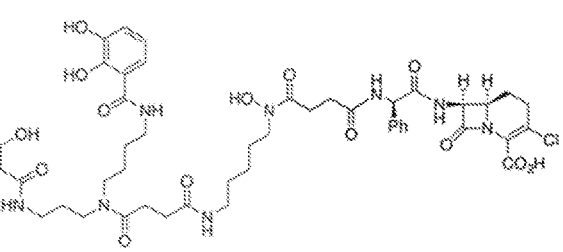

7, R = H, tri-catchol ampicillin conjugate
8, R = OH, tri-catechol amoxicillin conjugate
targets *P. areuginosa*

9, mixed ligand carbacephalosporin conjugate with selective anti-*Acinetobacter* activity

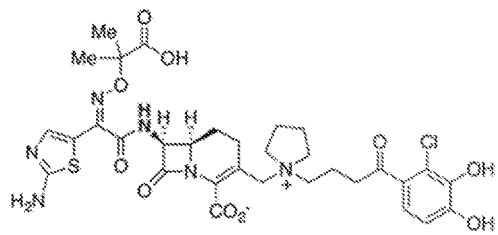

11, cefiderocol (Shionogi) catechol cephalosporin conjugate

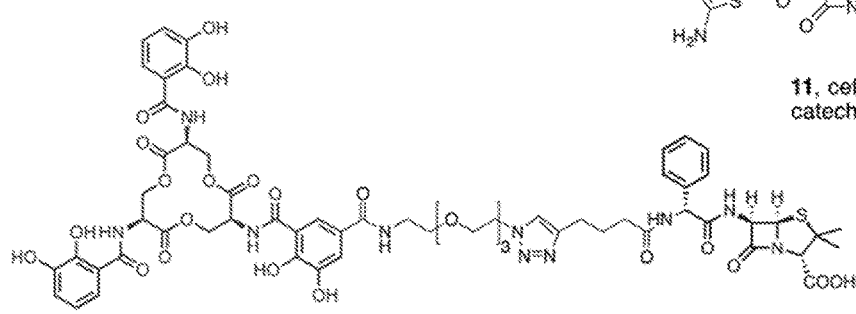

10, enterobactin ampicillin conjugate targets *E. coli*

FIG. 2

12, mycobactin artemisinin conjugate
selective anti-tuberculosis activity

13, mixed ligand daptomycin conjugate
selective *Acinetobacter baumannii* activity

FIG. 3

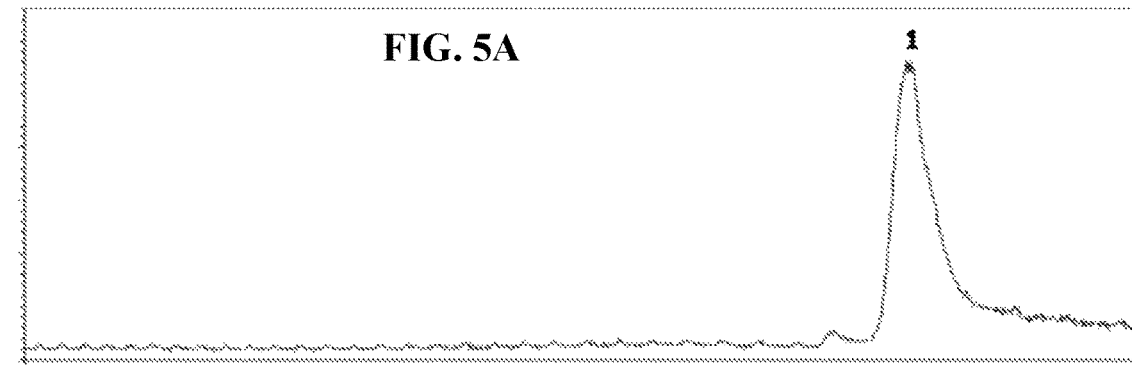
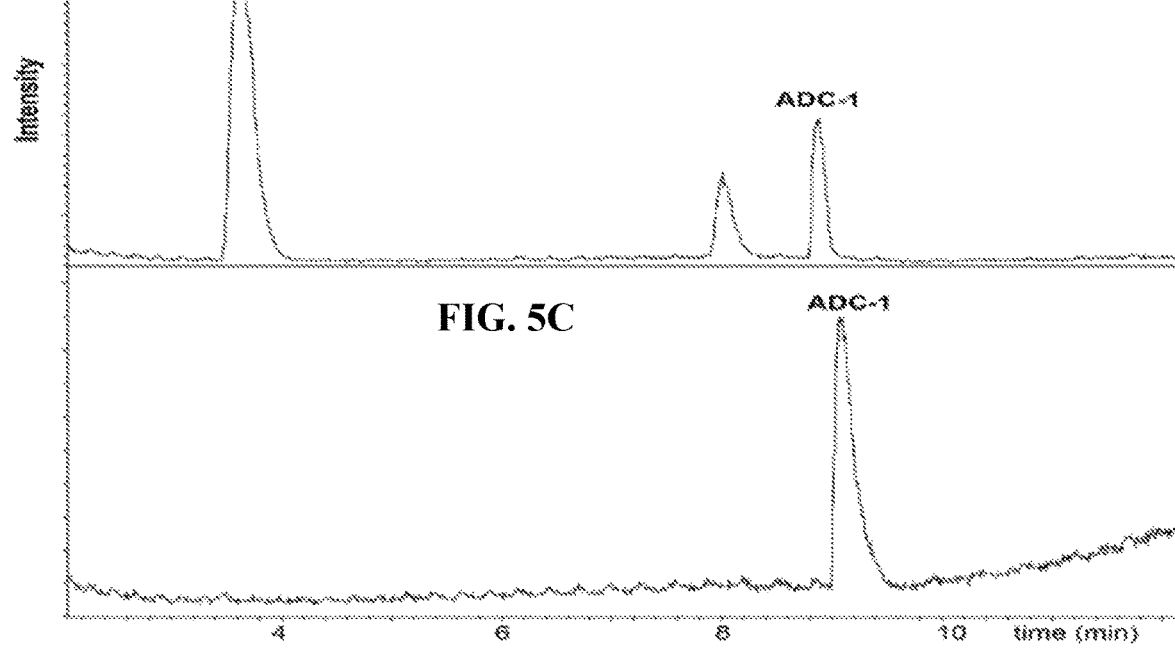

ANTIBIOTIC CONJUGATES

CROSS-REFERENCE TO RELATED APPLICATION

This application claims the benefit of and priority to U.S. Provisional Application No. 62/668,969, filed on May 9, 2018, the content of which is incorporated by reference herein in its entirety.

STATEMENT REGARDING FEDERALLY SPONSORED RESEARCH OR DEVELOPMENT

This invention was made with government support under grant No. 1R01AI114668 awarded by the National Institutes of Health. The United States Government has certain rights in the invention.

TECHNICAL FIELD

The invention relates to novel antibiotic conjugates and the use thereof in treating bacterial infection, including the infections caused by Gram-negative bacteria.

BACKGROUND

There remains an urgent need for new antibiotics and strategies for treating multi-drug resistant bacterial infections. While bacterial resistance has developed to essentially all of our current antibiotics, few new antibiotics have been developed over the last several decades. A primary cause of drug resistance is the overuse of antibiotics that can result in alteration of microbial permeability, alteration of drug target binding sites, induction of enzymes that destroy antibiotics (e.g., β-lactamases) and even induction of efflux mechanisms. The World Health Organization (WHO) recently labeled infections due to β-lactamase producing strains of *A. baumannii* and *Pseudomonas aeruginosa* as being of critical concern world-wide.

The need for new antibiotics is even more urgent in the case of Gram-negative bacteria, such as *Acinetobacter*, *Pseudomonas*, and Enterobacteria, which have become resistant to many antibiotics and have an outer membrane with very low permeability to drugs. Vectorization of antibiotics using siderophores may be a solution to bypass such a bacterial wall: drugs may be conjugated to a siderophore, which may then be delivered to the bacteria through the use of the iron transporters located on the outer membrane of the bacteria (known as a "Trojan-horse" strategy). However, currently there are at least two bottlenecks limiting the use of antibiotic vectorization by siderophores against Gram-negative bacteria: (1) the difficulty to cross the inner membrane and bring the antibiotic into the bacterial cytoplasm, and (2) the challenge to efficiently release the antibiotic from the siderophore after delivery to the bacteria (Schalk, J. Med. Chem. 2018, 61(9), 3842-3844). Accordingly, there remains a multitude of unsolved technical problems associated with siderophore-antibiotic conjugated in treating bacteria, especially Gram-negative bacteria.

SUMMARY

In one aspect, the present invention provides novel antibiotic conjugate compounds. In a particular aspect, provided are compounds of formula (I)

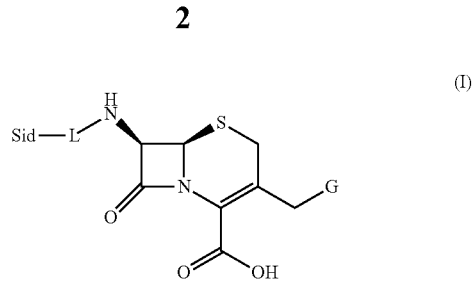

or a pharmaceutically acceptable salt thereof, wherein
Sid is a siderophore moiety;
L is a bond or a linker moiety;
G is -G$^1$ or —X—(CH$_2$)$_p$C(O)-G$^1$;
X is O or S;
p is 0, 1, 2, 3, 4, or 5; and
G$^1$ is a drug moiety attached through an oxygen or nitrogen atom.

The disclosed compounds may contain a β-lactamases substrate moiety (such as a cephalosporin moiety) as a hydrolyzable linker (FIG. 1). Upon being transported across the bacteria's outer membrane, the β-lactamases substrate moiety is hydrolyzed by the native β-lactamases of the bacteria, allowing the release of the drug moiety (such as oxazolidinone). In some embodiments, the disclosed compounds enable release of the drug moiety in the periplasm of a Gram-negative bacteria, which may subsequently enter the cytoplasm of the bacteria.

In another aspect, the present invention provides a method of treating bacterial infection, comprising administering to a subject infected by a bacterium an effective amount of a compound disclosed herein, or a pharmaceutically acceptable salt thereof.

In yet another aspect, the present invention provides a pharmaceutical composition, comprising a compound disclosed herein and a pharmaceutically acceptable carrier.

BRIEF DESCRIPTION OF THE FIGURES

FIG. 2 shows selected representative examples of synthetic sideromycins containing β-lactam warheads.

FIG. 3 shows representative non β-lactam synthetic and highly targeted sideromycins.

FIGS. 5A, 5B, and 5C show the results of cephalosporinase (ADC-1)-induced hydrolytic release of oxazolidinone (3) from conjugate (1). LCMS Base Peak Chromatograms of pure conjugate (FIG. 5A), product formed following reaction with ADC-1 (FIG. 5B), and ADC-1 only (FIG. 5C) are provided.

DETAILED DESCRIPTION

Figure 1:
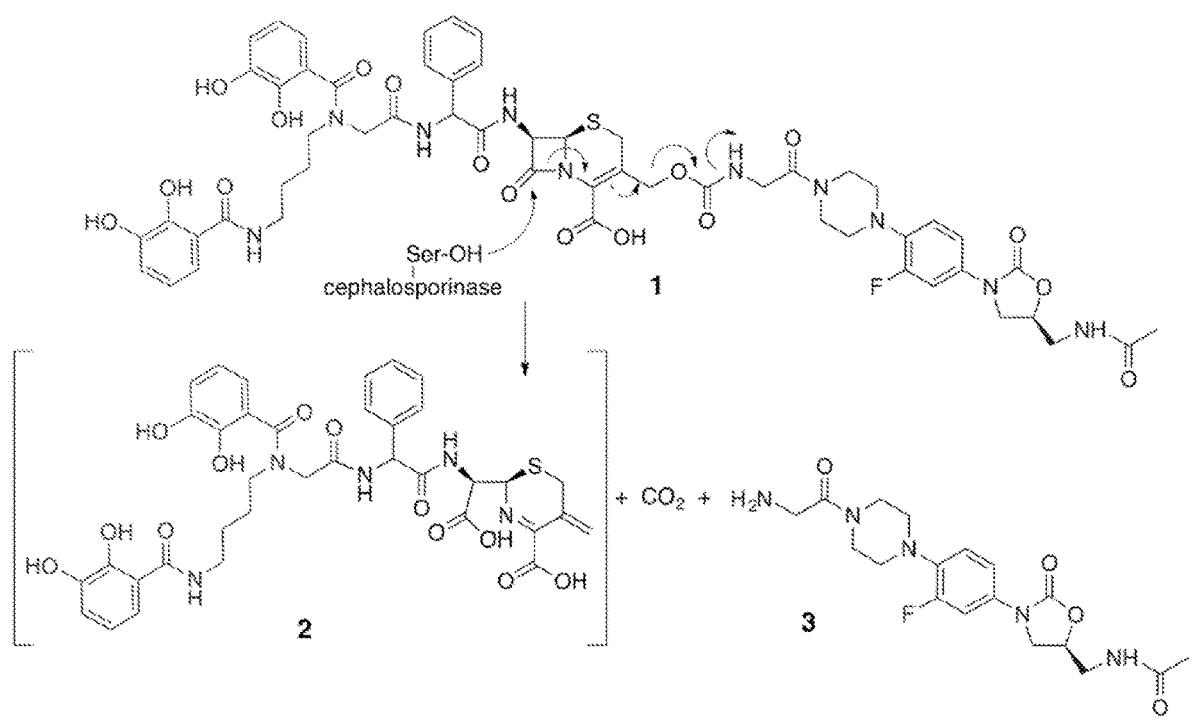
FIG. 1 shows a representative siderophore-cephalosporine-oxazolidinone conjugate 1 and a representative pathway of cephalosporinase triggered release of oxazolidinone 3.
Figure 4:
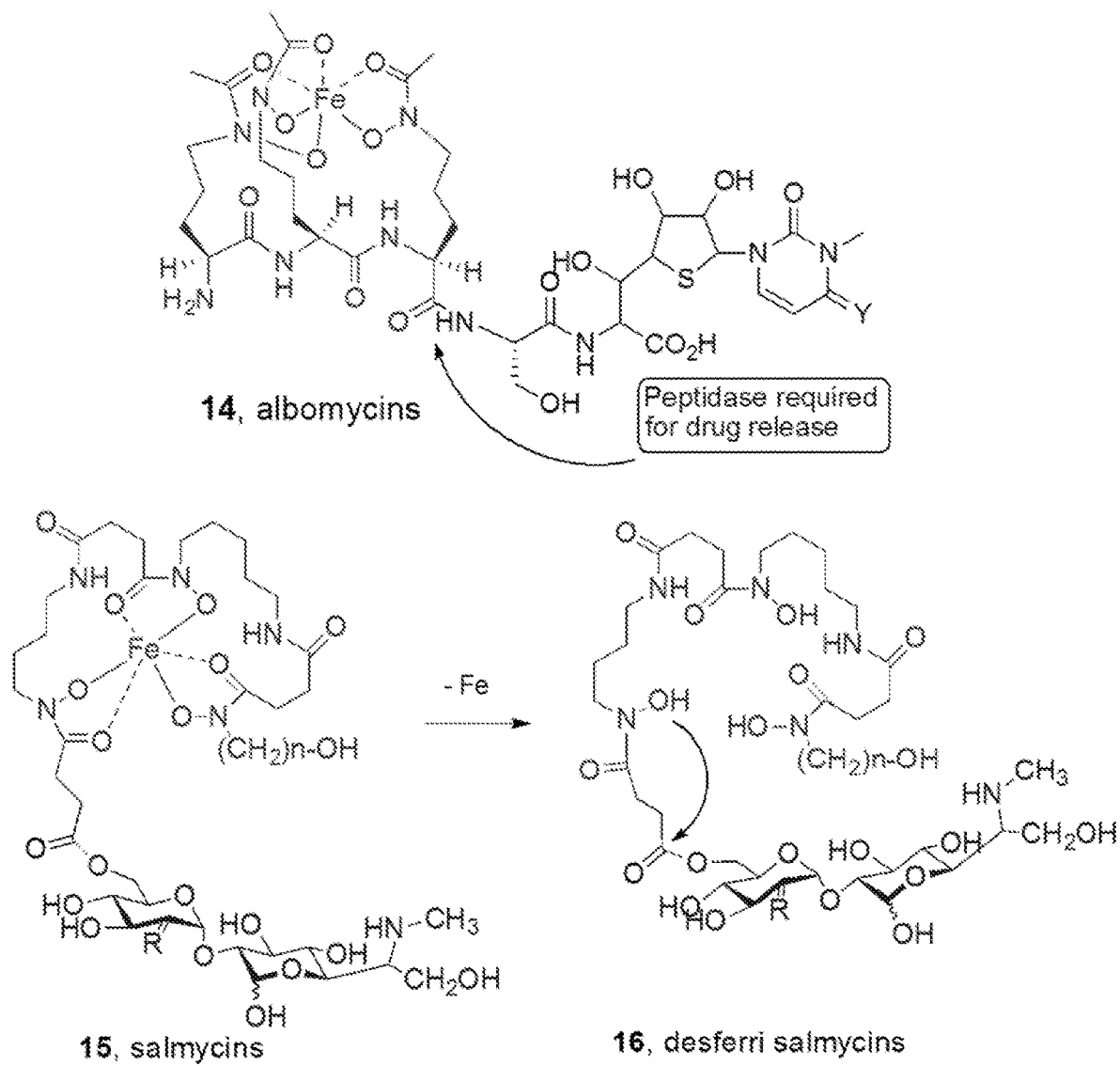
FIG. 4 shows representative natural sideromycins, albomycins and salmycins, and their requirement for drug release.

The present disclosure relates to the synthesis of compound of formula (I) and their use as antibiotic conjugates against Gram-negative bacteria. In a particular embodiment, a conjugate compound (1) is synthesized herein, which includes a siderophore linked to a cephalosporin with an attached oxazolidinone. The present compounds may be rapidly hydrolyzed by β-lactamase and may be active against various types of Gram-negative bacteria. Surprisingly, by linking a siderophore moiety and an antibiotic drug through a β-lactamases substrate moiety, the disclosed conjugate compounds provide the advantages of simultaneously solving two important challenges in the antibiotic delivery: transportation across bacterial membrane and effective release of the antibiotic. Thus, the disclosed compounds allow for improved delivery of antibiotic agents and provide a new solution in treating Gram-negative bacteria.

1. Definitions

The following definitions are provided as a general guide to understanding the claims and embodiments and are applicable where specific definitions are absent.

The term "alkyl" as used herein, means a straight or branched chain saturated hydrocarbon. Representative examples of alkyl include, but are not limited to, methyl, ethyl, n-propyl, isopropyl, n-butyl, sec-butyl, isobutyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "aryl," as used herein, means phenyl or a bicyclic aryl. The bicyclic aryl is naphthyl, dihydronaphthalenyl, tetrahydronaphthalenyl, indanyl, or indenyl. The phenyl and bicyclic aryls are attached to the parent molecular moiety through any carbon atom contained within the phenyl or bicyclic aryl.

The term "cycloalkyl" as used herein, means a monocyclic all-carbon monocyclic or multicyclic ring system containing zero heteroatoms as ring atoms, and zero double bonds. Examples of cycloalkyls include, but are not limited to, cyclopropyl, cyclobutyl, cyclopentyl, cyclohexyl, cycloheptyl, and cyclooctyl. The cycloalkyl groups described herein can be appended to the parent molecular moiety through any substitutable carbon atom.

The term "cycloalkenyl" as used herein, means a non-aromatic, monocyclic all-carbon monocyclic or multicyclic ring system containing zero heteroatoms as ring atoms and at least one carbon-carbon double bond. Exemplary monocyclic cycloalkenyl rings include cyclopentenyl, cyclohexenyl or cycloheptenyl.

The term "halogen" means a chlorine, bromine, iodine, or fluorine atom.

The term "haloalkyl," as used herein, means an alkyl, as defined herein, in which one, two, three, four, five, six, or seven hydrogen atoms are replaced by halogen. For example, representative examples of haloalkyl include, but are not limited to, 2-fluoroethyl, difluoromethyl, trifluoromethyl, 2,2,2-trifluoroethyl, 2,2,2-trifluoro-1,1-dimethylethyl, and the like.

The term "heteroaryl," as used herein, means an aromatic heterocycle, i.e., an aromatic ring that contains at least one heteroatom. A heteroaryl may contain from 5 to 12 ring atoms. A heteroaryl may be a 5- to 6-membered monocyclic heteroaryl or an 8- to 12-membered bicyclic heteroaryl. A 5-membered monocyclic heteroaryl ring contains two double bonds, and one, two, three, or four heteroatoms as ring atoms. Representative examples of 5-membered monocyclic heteroaryls include, but are not limited to, furanyl, imidazolyl, isoxazolyl, isothiazolyl, oxadiazolyl, oxazolyl, pyrazolyl, pyrrolyl, tetrazolyl, thiadiazolyl, thiazolyl, thienyl, and triazolyl. A 6-membered heteroaryl ring contains three double bonds, and one, two, three or four heteroatoms as ring atoms. Representative examples of 6-membered monocyclic heteroaryls include, but are not limited to, pyridinyl, pyridazinyl, pyrimidinyl, pyrazinyl, and triazinyl.

The bicyclic heteroaryl is an 8- to 12-membered ring system having a monocyclic heteroaryl fused to an aromatic, saturated, or partially saturated carbocyclic ring, or fused to a second monocyclic heteroaryl ring. Representative examples of bicyclic heteroaryl include, but are not limited to, benzofuranyl, benzoxadiazolyl, 1,3-benzothiazolyl, benzimidazolyl, benzothienyl, indolyl, indazolyl, isoquinolinyl, naphthyridinyl, oxazolopyridine, quinolinyl, thienopyridinyl, 5,6,7,8-tetrahydroquinolinyl, and 6,7-dihydro-5H-cyclopenta[b]pyridinyl. The heteroaryl groups are connected to the parent molecular moiety through any substitutable carbon atom or any substitutable nitrogen atom contained within the groups.

The terms "heterocycle" or "heterocyclic" refer generally to ring systems having at least one non-aromatic ring that contains at least one heteroatom as a ring atom where the heteroatom is selected from oxygen, nitrogen, and sulfur. In some embodiments, a nitrogen or sulfur atom of the heterocycle is optionally substituted with oxo. Heterocycles may be a monocyclic heterocycle, a fused bicyclic heterocycle, or a spiro heterocycle. The monocyclic heterocycle is generally a 4, 5, 6, 7, or 8-membered non-aromatic ring containing at least one heteroatom selected from O, N, or S. The 4-membered ring contains one heteroatom and optionally one double bond. The 5-membered ring contains zero or one double bond and one, two or three heteroatoms. The 6, 7, or 8-membered ring contains zero, one, or two double bonds, and one, two, or three heteroatoms. Representative examples of monocyclic heterocycle include, but are not limited to, azetidinyl, azepanyl, diazepanyl, 1,3-dioxanyl, 1,4-dioxanyl, 1,3-dioxolanyl, 4,5-dihydroisoxazol-5-yl, 3,4-dihydropyranyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, oxetanyl, piperazinyl, piperidinyl, pyranyl, pyrazolinyl, pyrazolidinyl, pyrrolinyl, pyrrolidinyl, tetrahydrofuranyl, tetrahydropyranyl, tetrahydrothienyl, thiadiazolinyl, thiadiazolidinyl, thiazolinyl, thiazolidinyl, thiomorpholinyl, 1, 1-dioxidothiomorpholinyl, thiopyranyl, and trithianyl. The fused bicyclic heterocycle is a 7-12-membered ring system having a monocyclic heterocycle fused to a phenyl, to a saturated or partially saturated carbocyclic ring, or to another monocyclic heterocyclic ring, or to a monocyclic heteroaryl ring. Representative examples of fused bicyclic heterocycle include, but are not limited to, 1,3-benzodioxolyl, 1,3-benzodithiolyl, 3-azabicyclo[3.1.0] hexanyl, hexahydro-1H-furo[3,4-c]pyrrolyl, 2,3-dihydro-1, 4-benzodioxinyl, 2,3-dihydro-1-benzofuranyl, 2,3-dihydro-1-benzothienyl, 2,3-dihydro-1H-indolyl, 5,6,7,8-tetrahydroimidazo[1,2-a]pyrazinyl, and 1,2,3,4-tetrahydroquinolinyl. Spiro heterocycle means a 4, 5-, 6-, 7-, or 8-membered monocyclic heterocycle ring wherein two of the substituents on the same carbon atom form a second ring having 3, 4, 5, 6, 7, or 8-members. Examples of a spiro heterocycle include, but are not limited to, 1,4-dioxa-8-azaspiro[4.5]decanyl, 2-oxa-7-azaspiro[3.5]nonanyl, 2-oxa-6-azaspiro[3.3]heptanyl, and 8-azaspiro[4.5]decane. The monocyclic heterocycle groups of the present invention may contain an bridge of 1, 2, or 3 carbon atoms, linking two nonadjacent atoms of the group. Examples of such a bridged heterocycle include, but are not limited to, 2,5-diazabicyclo [2.2.1]heptanyl, 2-azabicyclo[2.2.1]heptanyl, 2-azabicyclo [2.2.2]octanyl, and oxabicyclo[2.2.1]heptanyl. The monocyclic, fused bicyclic, and spiro heterocycle groups are connected to the parent molecular moiety through any substitutable carbon atom or any substitutable nitrogen atom contained within the group.

The term "oxo" as used herein refers to an oxygen atom bonded to the parent molecular moiety by a double bond. An oxo may be attached to a carbon atom or a sulfur atom by a double bond. Alternatively, an oxo may be attached to a nitrogen atom by a single bond, i.e., an N-oxide.

Terms such as "alkyl," "cycloalkyl," etc. may be preceded by a designation indicating the number of atoms present in the group in a particular instance (e.g., "$C_{1-4}$alkyl," "$C_{3-6}$ cycloalkyl"). These designations are used as generally understood by those skilled in the art. For example, the representation "C" followed by a subscripted number indicates the number of carbon atoms present in the group that follows. Thus, "$C_3$alkyl" is an alkyl group with three carbon atoms (i.e., n-propyl, isopropyl). Where a range is given, as in "$C_{1-4}$," the members of the group that follows may have any number of carbon atoms falling within the recited range. A "$C_{1-4}$alkyl," for example, is an alkyl group having from 1 to 4 carbon atoms, however arranged (i.e., straight chain or branched).

The term "protecting group" refers to a moiety that prevents chemical reactions from occurring on a heteroatom (such as, N, O, or S) to which that protecting group is attached. Various protecting groups are well known in the art and include those described in detail in Greene's Protective Groups in Organic Synthesis, T. W. Greene and P. G. M. Wuts, $4^{th}$ edition, John Wiley & Sons, 2007, the entirety of which is incorporated herein by reference. For example, suitable amino protecting groups include, but are not limited to, carbobenzyloxy (—NHCO—OCH2C6H5 or —NH-Cbz); t-butyloxycarbonyl (—NHCO—OC(CH3)3 or —NH-Boc); 9-fluorenylmethyloxycarbonyl (—NH—Fmoc), 2,2,2-trichloroethyloxycarbonyl (—NH-Troc), and allyloxycarbonyl (—NH-Alloc). In each of the foregoing, the —NH— represents the nitrogen from the amino group that is being protected.

Unless otherwise stated, structures depicted herein are also meant to include all isomeric (e.g., enantiomeric, diastereomeric, and geometric (or conformational)) forms of the structure; for example, the R and S configurations for each asymmetric center, (Z) and (E) double bond isomers, and (Z) and (E) conformational isomers. Therefore, single stereochemical isomers as well as enantiomeric, diastereomeric, and geometric (or conformational) mixtures of the present compounds are within the scope of the invention. Unless otherwise stated, all tautomeric and zwitterionic forms of the compounds of the invention are within the scope of the invention.

The terms "effective amount" or "therapeutically effective amount," as used herein, refer to a sufficient amount of an agent or a composition or combination of compositions being administered which will relieve to some extent one or more of the symptoms of the disease or condition being treated. The result can be reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case may be determined using techniques, such as a dose escalation study. The dose could be administered in one or more administrations. However, the precise determination of what would be considered an effective dose may be based on factors individual to each patient, including, but not limited to, the patient's age, size, type or extent of disease, stage of the disease, route of administration of the regenerative cells, the type or extent of supplemental therapy used, ongoing disease process and type of treatment desired (e.g., aggressive vs. conventional treatment).

As used herein, "treat," "treating" and the like means a slowing, stopping or reversing of progression of cancer when provided a composition described herein to an appropriate control subject. The term also means a reversing of the progression of such a disease or disorder to a point of eliminating or greatly reducing the cell proliferation. As such, "treating" means an application or administration of the compositions described herein to a subject, where the subject has a disease or a symptom of a disease, where the purpose is to cure, heal, alleviate, relieve, alter, remedy, ameliorate, improve or affect the disease or symptoms of the disease.

As used herein, "subject" or "patient" means an individual having symptoms of, or at risk for, a disease or disorder (such as cancer or other malignancy). A patient may be human or non-human and may include, for example, animal strains or species used as "model systems" for research purposes, such a mouse model as described herein. Likewise, patient may include either adults or juveniles (e.g., children). Moreover, patient may mean any living organism, preferably a mammal (e.g., human or non-human) that may benefit from the administration of compositions contemplated herein. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. Examples of non-mammals include, but are not limited to, birds, fish and the like. In one embodiment of the methods and compositions provided herein, the mammal is a human.

As used herein, the terms "providing", "administering," "introducing," are used interchangeably herein and refer to the placement of the compositions of the disclosure into a subject by a method or route which results in at least partial localization of the composition to a desired site. The compositions can be administered by any appropriate route which results in delivery to a desired location in the subject.

The term "siderophore compound" refers to a synthetic or natural iron binding agent that is recognized by bacteria. Representative such siderophores may consist of combinations of hydroxamic acids, catechols, ortho-hydroxy benzoates, oxazolines, hydroxyl acids, and derivatives thereof. Example siderophore compounds include, but are not limited to, those described in Hider et al. (*Natural Prod. Reports*, 2010, 27, 637-657), WO 2014/171971, and WO 2015/061630, which are incorporated herein by reference in their entirety.

The term "drug" as described herein means an agent which negatively affects a bacteria's growth if actively or passively assimilated by the bacteria.

2. Compounds

A. Introduction

In order to develop and sustain an infection, bacteria must sequester iron that is needed for essential physiological processes. In fact, bacteria require micromolar concentrations of iron yet the concentration of free iron in human serum is ~$10^{24}$ molar. Thus, bacteria synthesize and excrete iron chelating agents called siderophores that bind ferric iron with high affinity. The resulting complex is then recognized by specific outer membrane proteins that initiate internalization by an active transport of the ferric siderophore. Subsequent reductive or hydrolytic release of the iron then makes it available to the bacteria. Since mammals do not utilize siderophores, exploitation of this essential bacterial reliance on iron uptake for virulence has potential for development of selective new antibiotic therapies.

Studies of natural and synthetic siderophore-antibiotic conjugates (sideromycins) are of interest for development of potential Trojan Horse antibiotics to especially target multidrug resistant bacterial infections. Most reported synthetic sideromycins consist of a siderophore or siderophore mimic directly attached to a β-lactam antibiotic. Many such constructs, including representatives (4-11) shown in FIG. 2, show enhanced and strain-selective antibacterial activity because of siderophore-receptor mediated active transport and reduced susceptibility to antibiotic efflux mechanisms. While some of these conjugates also are less prone to deactivation by β-lactamases, the activity of other more susceptible conjugates is augmented by co-administration of β-lactamase inhibitors.

To further circumvent problems associated with β-lactamases, siderophore conjugates with non-β-lactam antibiotics have been designed and synthesized. Some siderophore conjugates with non-releasable linkers to other antibiotics, especially those with cytoplasmic targets, might not be recognized by the targets while the warhead remains attached to the siderophore and thus do not have enhanced activity. However, representative compounds shown in FIG. 3 have remarkably potent activity against bacteria targeted by the bacteria-selective siderophore component. In fact, this strategy allows delivery of antibiotics, regardless of size or charge, into microbial cells and induces efficacy of these drugs against pathogens that are normally not susceptible to the antibiotic alone. For example, while artemisinin, a small uncharged antimalarial drug, has no anti-tuberculosis activity itself, its mycobactin conjugate 12, is a potent anti-TB agent that is completely selective for *Mycobacterium tuberculosis* (Mtb). It is not active against any other strain of mycobacteria nor any other Gram-negative or Gram-positive bacteria because the siderophore component is specific for Mtb. In another case, the mixed ligand, bis-catechol, monohydroxamate, conjugate (13) of daptomycin, a large, polyanionic antibiotic, confers potent and selective activity of daptomycin against multi-drug resistant strains of *A. baumannii*, even though the parent daptomycin itself is only active against Gram-positive bacteria.

In all cases shown in FIG. 2 and FIG. 3, the synthetic sideromycins were made by direct coupling of the siderophore component to the antibiotic warhead and no intracellular drug release process was necessary since the intact sideromycin is recognized by the antibiotic target. However, as shown in FIG. 4, most natural sideromycins require an intracellular process that allows release of the antibiotic component once the conjugate is sequestered and actively transported into the bacterial cell. Albomycins (14) and salmycins (15) are the most well studied natural sideromycins. The tRNA synthetase inhibitor of albomycin and the aminoglycoside component of salmycin have no antibiotic activity alone, presumably since they cannot reach their cytoplasmic targets. However, the natural siderophore conjugates are potently active. In the case of the albomycins, bacterial peptidases cleave the seryl tRNA synthetase inhibitor from the conjugate after active transport allowing the inhibitor to exert its toxic effect. Intracellular reductive removal of the iron from salmycins to desferri salmycins (16) may trigger intramolecular cyclization with concomitant release of the aminoglycoside antibiotic. Thus, further expansion of the sideromycin-based Trojan Horse approach must consider the nature of the linker between the iron binding component and the warhead to be delivered.

Early attempts to incorporate releasable linkers included introduction of randomly hydrolysable linkers, but these are prone to premature release before bacterial assimilation. More recent efforts include examples of esterase-triggered and reductive-cyclization-induced release following bacterial internalization of the synthetic sideromycin. As indicated earlier, β-lactams conjugated to siderophores can still be susceptible to hydrolysis by destructive β-lactamase enzymes. Many studies have demonstrated that Non-siderophore derivatives of appropriate covalent combinations of cephalosporins or penicillins with other drugs create dual action agents with activity due to the β-lactam component but, if that is susceptible to a β-lactamase, the destructive ring opening results in release of the additional attached drug. β-Lactamase-triggered hydrolysis of cephalosporin-antitumor conjugates has also been widely studied, indicating that cephalosporinases can recognize and cleave cephalosporins even when conjugated to large molecules. However, to date, no attempts have been made to utilize lactamase-triggered hydrolysis in the delivery of antibiotics, or, more specifically, in any siderophore mediated delivery methods against Gram-negative bacteria.

B. Novel Conjugate Compounds

It is surprisingly found herein that a siderophore conjugate of a β-lactamase enzymes substrate (such ascephalosporin) with an additional antibiotic create a new class of multiple action sideromycin. In particular, the new conjugate compounds disclosed herein may target both β-lactam susceptible bacteria and β-lactamase-producing bacteria. Significantly, for bacteria that produce β-lactamase, the β-lactamase enzymes substrate moiety of the disclosed compounds serves as a hydrolyzable linker, which releases the antibiotic warhead upon hydrolysis by the β-lactamase produced by the bacteria. Through this approach, the normally deleterious β-lactamase enzyme may be utilized to induce the targeted bacterial to commit suicide.

In one aspect, provided herein are compounds or compositions of formula (I)

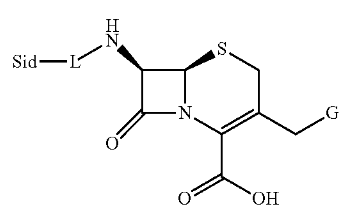

(I)

or a pharmaceutically acceptable salt thereof, wherein

Sid is a siderophore moiety;

L is a bond or a linker moiety;

G is $-G^1$ or $—X—(CH_2)_pC(O)-G^1$;

X is O or S;

p is 0, 1, 2, 3, 4, or 5; and $G^1$ is a drug moiety attached through an oxygen or nitrogen atom.

The siderophore moiety as used in formula (I) is a partial structure derived from a siderophore compound. As defined herein, the siderophore compound may be a synthetic or natural compound. Synthetic siderophore compounds include synthetic analogs and derivatives of natural siderophore compounds. In some embodiments, the siderophore moiety is the partial structure resulting from removal of a terminal —COOH, —NH$_2$, or —OH group from a free siderophore compound. For example, the free siderophore compound, from which the "Sid" moiety of formula (I) is derived, may be represented by Sid-COOH, Sid-NH$_2$, or Sid-OH.

Examples of the siderophore moiety of formula (I) include, but are not limited to, Sid-1 to Sid-9 as shown below:

(Sid-1)

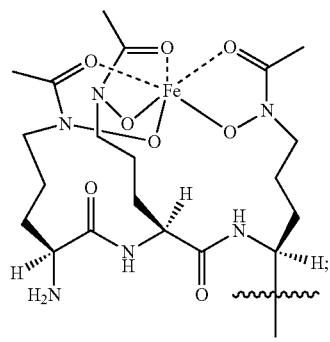

(Sid-2)

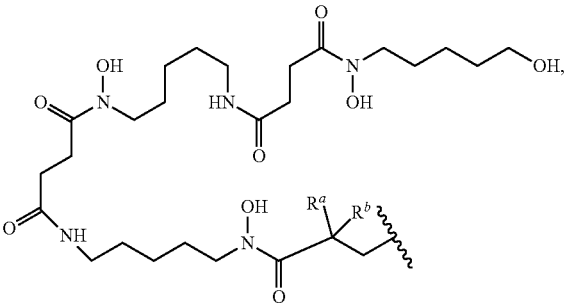

wherein R$^a$ and R$^b$ are each independently hydrogen or C$_{1-4}$alkyl;

(Sid-3)

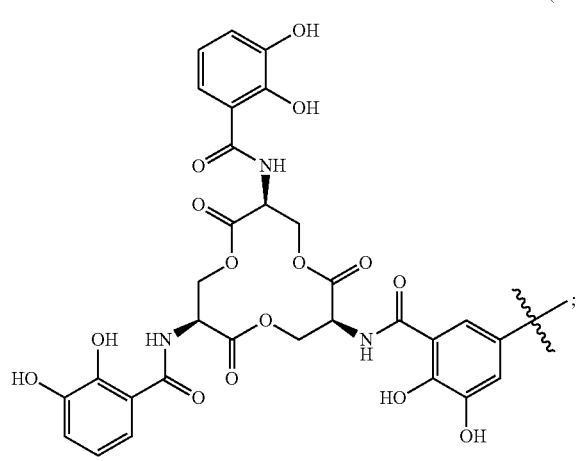

(Sid-4)

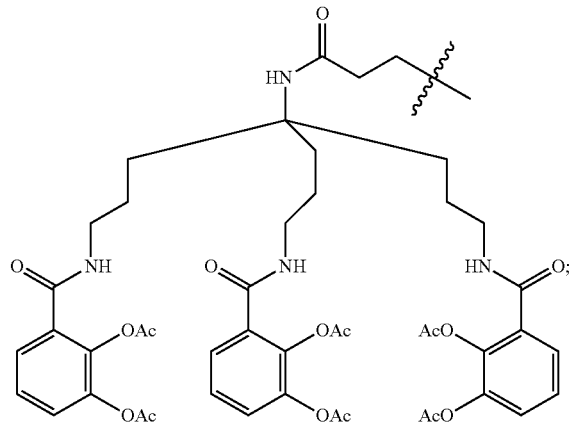

(Sid-5)

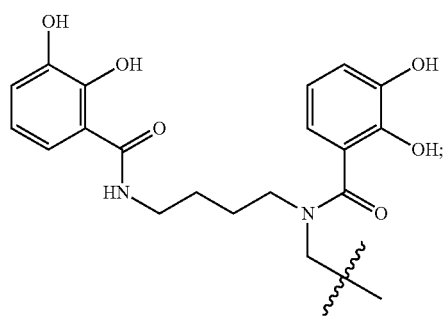

(Sid-6)

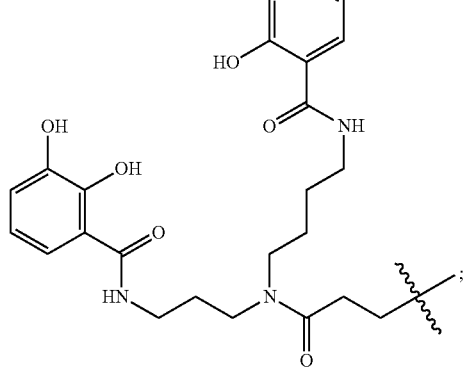

-continued (Sid-7)
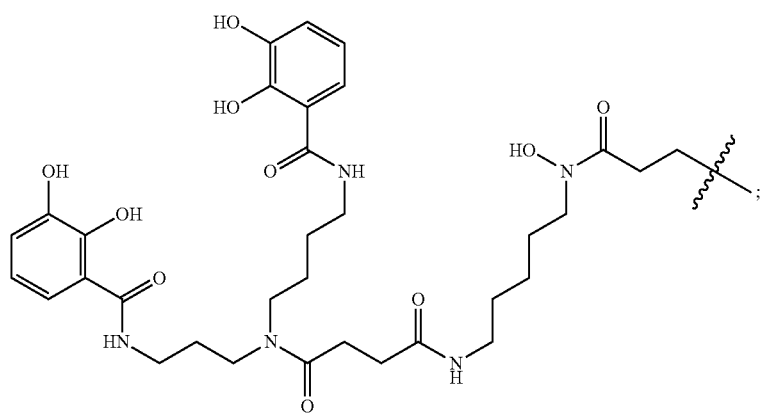

(Sid-8)
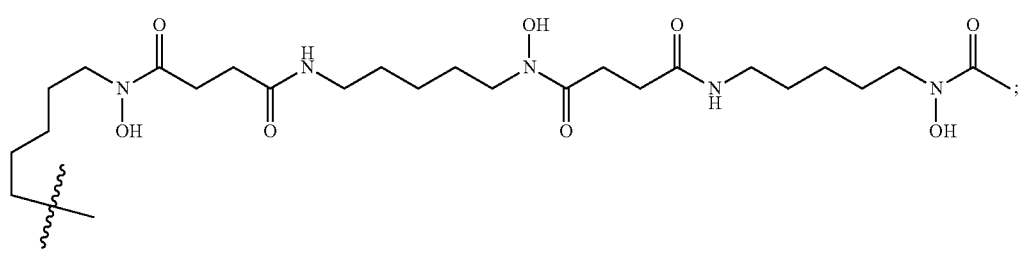

(Sid-9)
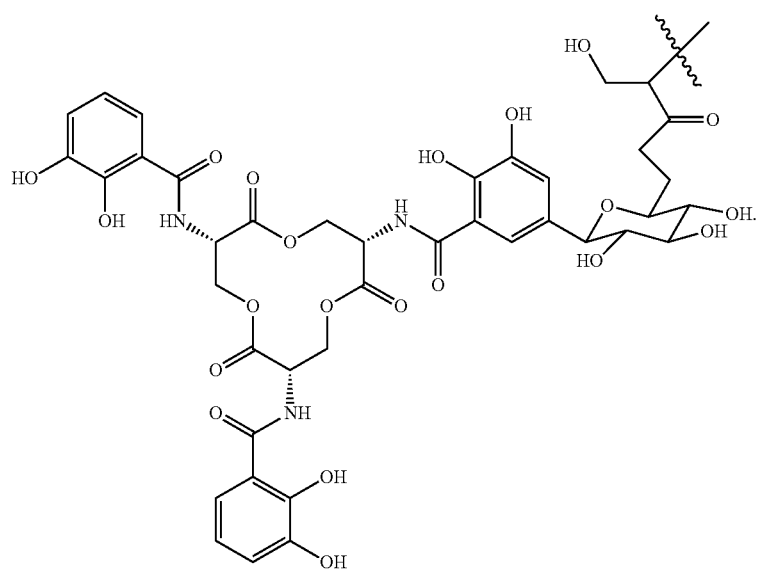

In some embodiments Sid-2 is Sid-2 A (Sid-2A)
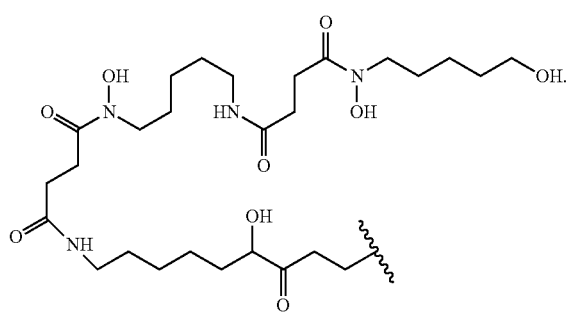

In some embodiments, L is bond, —C(O)—, —C(O)NHCH(R$^1$)—C(O)—, —C(O)OCH(R$^2$)—C(O)—, or

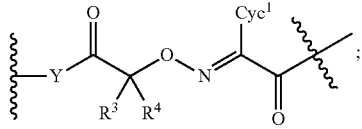

R$^1$ and R$^2$ are each hydrogen, C$_{1-6}$alkyl, C$_{3-6}$cycloalkyl, C$_{3-6}$cycloalkenyl, 6- to 12-membered aryl, or 5- to 12-membered heteroaryl, wherein the cycloalkyl, cycloalkenyl, aryl, or heteroaryl is optionally substituted with 1-5 substituents independently selected from the group consisting of halogen, $C_{1-4}$alkyl, $C_{1-4}$haloalkyl, —$OC_{1-4}$alkyl, —$OC_{1-4}$haloalkyl, OH, oxo, and cyano;

$R^3$ and $R^4$ are each independently hydrogen, $C_{1-6}$alkyl, or $R^3$ and $R^4$ together with the C atom to which they are attached form a 3- to 8-membered ring;

$Cyc^1$ is a 6- to 12-membered aryl or 5- to 12-membered heteroaryl, wherein the aryl or heteroaryl is optionally substituted with 1-5 substituents independently selected from the group consisting of halogen, $C_{1-4}$alkyl, $C_{1-4}$haloalkyl, —$OC_{1-4}$alkyl, —$OC_{1-4}$haloalkyl, OH, oxo, and cyano; and Y is O or NH.

In some embodiments, L is bond, —C(O)—, or —C(O)NHCH($R^1$)—C(O)—. In some embodiments, L is —C(O)— or —C(O)NHCH($R^1$)—C(O)—. In some embodiments, L is —C(O)NHCH($R^1$)—C(O)—. For example, the Sid-L-moiety may be Sid-C(O)— or Sid-C(O)NHCH($R^1$)—C(O)—.

In some embodiments, $R^1$ and $R^2$ are each $C_{3-6}$cycloalkenyl, 6- to 12-membered aryl, or 5- to 12-membered heteroaryl, wherein the cycloalkenyl, aryl, or heteroaryl is optionally substituted with 1-5 substituents independently selected from the group consisting of halogen, $C_{1-4}$alkyl, $C_{1-4}$haloalkyl, —$OC_{1-4}$alkyl, —$OC_{1-4}$haloalkyl, OH, oxo, and cyano. In some embodiments, $R^1$ and $R^2$ are

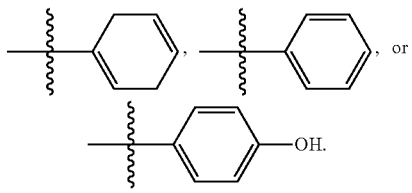

In some embodiments, $R^1$ and $R^2$ are

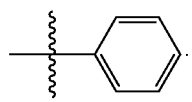

In some embodiments, the Sid-L-moiety is

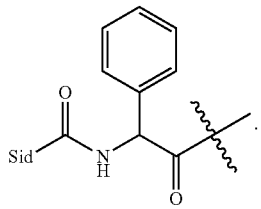

In some embodiments, L is

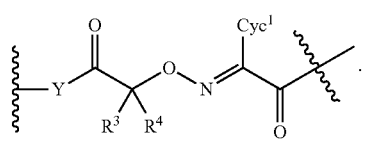

For example, the Sid-L- moiety may be

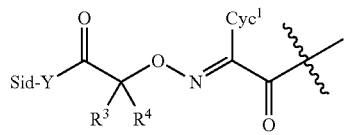

In some embodiments, $R^3$ and $R^4$ are each independently hydrogen, $C_{1-6}$alkyl. In some embodiments, $R^3$ and $R^4$ together with the C atom to which they are attached form a 3- to 8-membered ring. In some embodiments, R3 and $R^4$ together with the C atom to which they are attached form

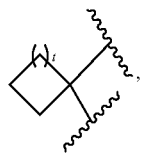

wherein t is 0, 1, 2, 3, 4, or 5. For example, L may be

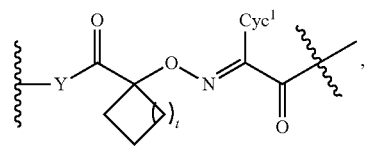

wherein t is 0, 1, 2, 3, 4, or 5. For example, the Sid-L-moiety may be

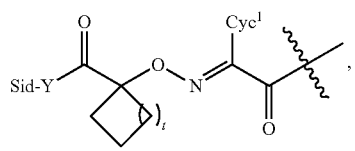

wherein t is 0, 1, 2, 3, 4, or 5. In some embodiments, t is 1, 2, or 3.

In some embodiments, $Cyc^1$ is

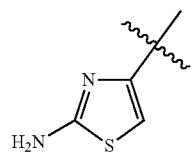

For example, L may be

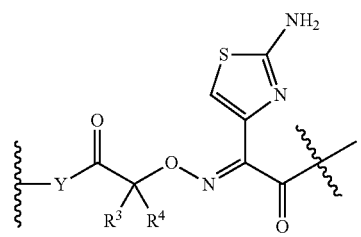

For example, the Sid-L– moiety may be

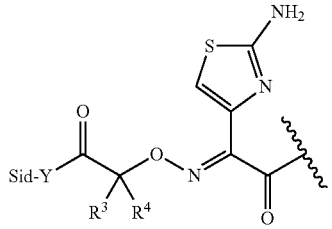

wherein $R^3$ and $R^4$ are each independently hydrogen, $C_{1-6}$alkyl, or $R^3$ and $R^4$ together with the C atom to which they are attached form a 3- to 8-membered ring.

In some embodiments, Y is NH. For example, L may be

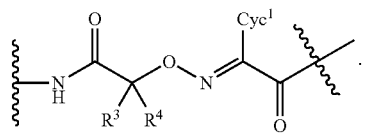

For example, the Sid-L– moiety may be

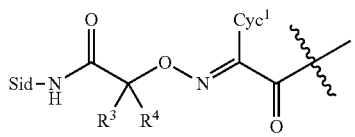

wherein R3 and $R^4$ are each independently hydrogen, $C_{1-6}$alkyl, or $R^3$ and $R^4$ together with the C atom to which they are attached form a 3- to 8-membered ring, and $Cyc^1$ is a 6- to 12-membered aryl or 5- to 12-membered heteroaryl, wherein the aryl or heteroaryl is optionally substituted with 1-5 substituents independently selected from the group consisting of halogen, $C_{1-4}$alkyl, $C_{1-4}$haloalkyl, —$OC_{1-4}$alkyl, —$OC_{1-4}$haloalkyl, OH, oxo, and cyano.

In some embodiments, Sid is selected from the group consisting of Sid-1, Sid-2, Sid-3, Sid-4, Sid-5, Sid-6, Sid-7, Sid-8, and Sid-9, and L is bond, —C(O)—, —C(O)NHCH($R^1$)—C(O)—, —C(O)OCH($R^2$)—C(O)—, or

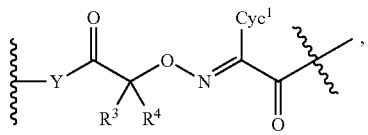

wherein the $R^1$, $R^2$, $R^3$, $R^4$, Y, and $Cyc^1$ groups are as described above.

In some embodiments, Sid is selected from the group consisting of Sid-1, Sid-2, Sid-3, Sid-4, Sid-5, Sid-6, and Sid-7, and L is a bond, —C(O)—, —C(O)NHCH($R^1$)—C(O)—, —C(O)OCH($R^2$)—C(O)—, or

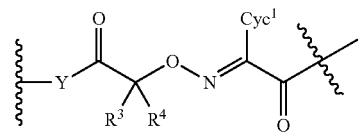

In some embodiments, Sid is selected from the group consisting of Sid-1, Sid-2, Sid-3, Sid-4, Sid-5, Sid-6, and Sid-7, and L is a bond, —C(O)—, or —C(O)NHCH($R^1$)—C(O)—. In some embodiments, Sid is selected from the group consisting of Sid-1, Sid-2, Sid-3, Sid-4, Sid-5, Sid-6, and Sid-7, and L is —C(O)NHCH($R^1$)—C(O)—.

For example, the Sid-L– moiety may be Sid-C(O)— or

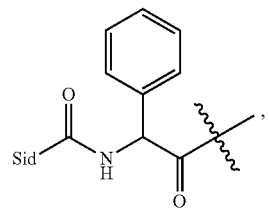

wherein Sid is selected from the group consisting of Sid-1, Sid-2, Sid-3, Sid-4, Sid-5, Sid-6, and Sid-7. In some embodiments, the Sid-L– moiety is

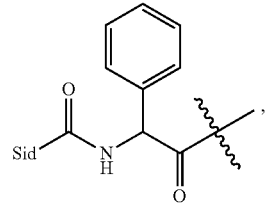

wherein Sid is selected from the group consisting of Sid-1, Sid-2, Sid-3, Sid-4, Sid-5, Sid-6, and Sid-7.

In some embodiments, Sid is Sid-8 or Sid-9, and L is bond, —C(O)—, —C(O)NHCH($R^1$)—C(O)—, —C(O)OCH($R^2$)—C(O)—, or

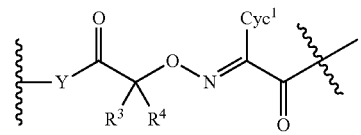

In some embodiments, Sid is Sid-8 or Sid-9, and L is bond or

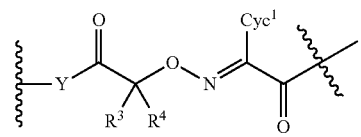

In some embodiments, Sid is Sid-8 or Sid-9, and L is

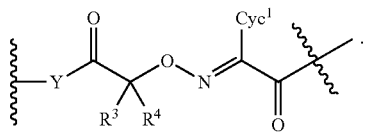

For example, the Sid-L-moiety may be

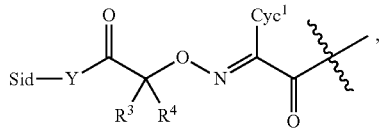

wherein Sid is Sid-8 or Sid-9. For example, the Sid-L-moiety may be

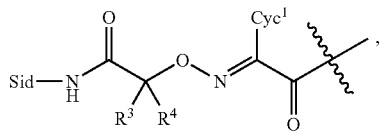

wherein Sid is Sid-8 or Sid-9. For example, the Sid-L-moiety may be

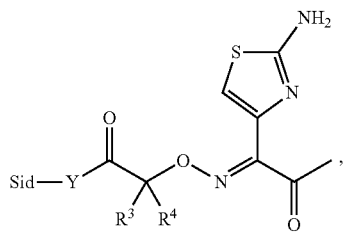

wherein Sid is Sid-8 or Sid-9.

In some embodiments, X is O. In some embodiments, X is S.

Is some embodiments, p is 0. In some embodiments, p is 1, 2, 3, 4, or 5. In some embodiments, X is O and p is 0. In some embodiments, X is O and p is 1 or 2. In some embodiments, X is S and p is 1, 2, or 3.

In some embodiments, G is $G^1$. In some embodiments, G is —OC(O)-$G^1$.

In some embodiments, L is bond, —C(O)—, or —C(O)NHCH($R^1$)—C(O)—, $R^1$ is phenyl; and G is $G^1$ or —OC(O)-$G^1$. For example, the Sid-L- moiety may be Sid-C(O)— or

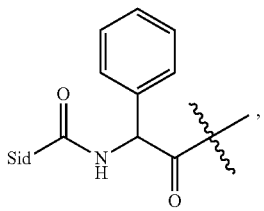

and G may be $G^1$ or —OC(O)-$G^1$.

$G^1$ is a drug moiety derived from the free form of a drug. In general, the drug molecule as used herein contains a functional group suitable for incorporation as a drug moiety into formula (I). In some embodiments, $G^1$ is a drug moiety attached to the remaining part of the disclosed compound through an oxygen atom, such as by forming an ether (—O—) or ester (—C(O)O—) bond. In some embodiments, $G^1$ is a drug moiety attached to the remaining part of the disclosed compound through a nitrogen atom, such as by forming a secondary amine (—NH—) or an amide (—C(O)NH—) bond. Attachment of the drug molecule to the remaining part of the disclosed compound may be carried out by synthesis methods known in the art. Representative drugs include, but are not limited to, amikacin, aminoglycoside, amoxicillin, amphotericin, ampicillin, ansamycin, azithromycin, aztreonam, bacillomycin, biapenem, carbacephalosporins, carbapenem, carbomycin, carbomycin A, carumonam, cefaclor, cefalotin, cephalosporin, cethromycin, chloramphenicol, chlortetracycline, ciprofloxacin, clarithromycin, clindamycin, cycloserine, daptomycin, demeclocycline, dirithromycin, doripenem, doxorubicin, doxycycline, ertapeneme, erythromycin, ethambutol, fluoroquinolone, gentamicin, isoniazid, josamycin, kanamycin, kitasamycin, lincomycin, linezolid, loracarbef, macrolide, meropenem, methacycline, midecamycin, monobactams, monocarbams, mupirocin, neomycin, nystatin, oleandomycin, oleandomycin, oxazolidinones, oxytetracycline, panipenem, penem, penicillin, peptide antibiotic, polymixin, pyrrolnitrin, quinolone, rhamoplanin, rifampin, rifamycins, rolitetracycline, roxithromycin, solithromycin, spiramycin, streptomycin, sulfabenzamide, sulfacetamide, sulfadiazine, sulfadoxine, sulfamerazine, sulfamethazine, sulfamethizole, sulfamethoxazole, sulfisoxazole, sulfonamide, teichoplanin, telithromycin, tetracycline, tigimonam, troleandomycin, tylosin, tylocine, and vancomycin.

In some embodiments, $G^1$ is oxazolidinone. For example, $G^1$ may be

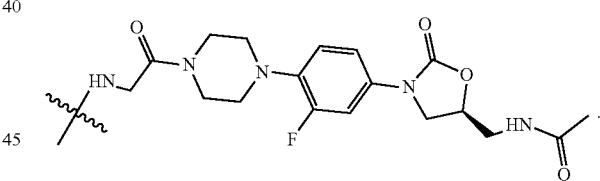

In some embodiments, the compound formula (I) is a compound of formula (I-a), or a pharmaceutically acceptable salt thereof,

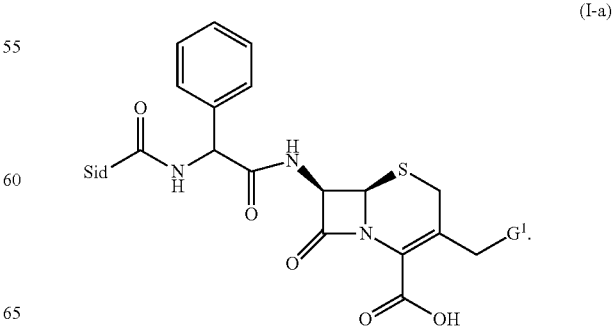

(I-a)

In some embodiments, the compound formula (I) is a compound of formula (I-b), or a pharmaceutically acceptable salt thereof,

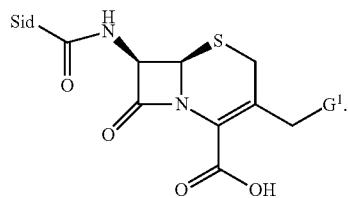

In some embodiments, the compound formula (I) is a compound of formula (I-c), or a pharmaceutically acceptable salt thereof,

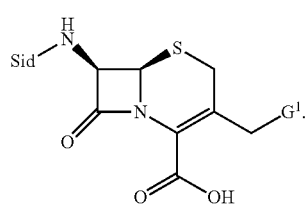

In some embodiments, the compound formula (I) is a compound of formula (I-d), or a pharmaceutically acceptable salt thereof,

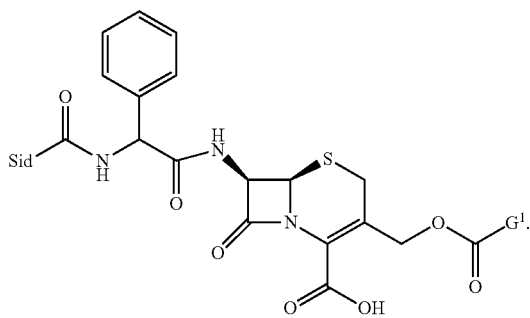

In some embodiments, the compound formula (I) is a compound of formula (I-e), or a pharmaceutically acceptable salt thereof,

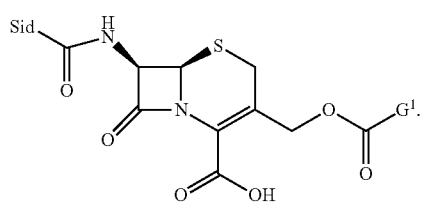

In some embodiments, the compound formula (I) is a compound of formula (I-f), or a pharmaceutically acceptable salt thereof,

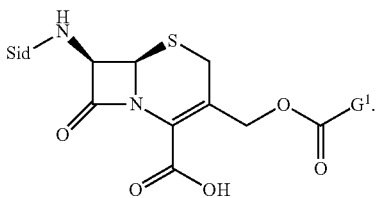

In certain embodiments, disclosed are compounds of formula (I), having a structure of formula A,

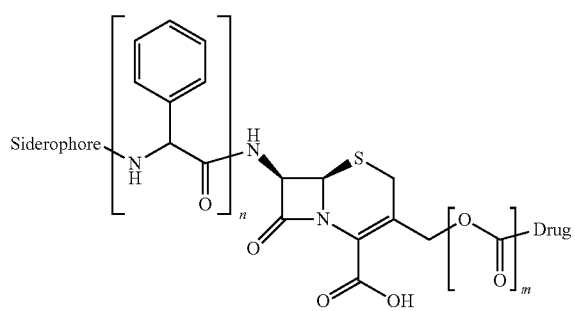

or a pharmaceutically acceptable salt thereof, wherein n is 0 or 1; and m is 0 or 1.

The "Siderophore" group as used in Formula A refers to a group derived from a siderophore compound as described herein. Suitable "Siderophore" groups as used in Formula A include, but are not limited to the following:

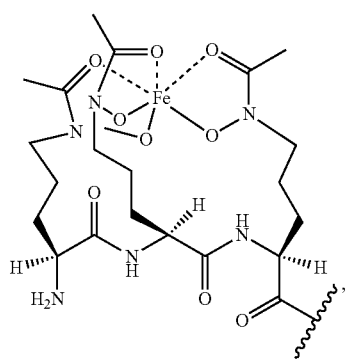

21
-continued
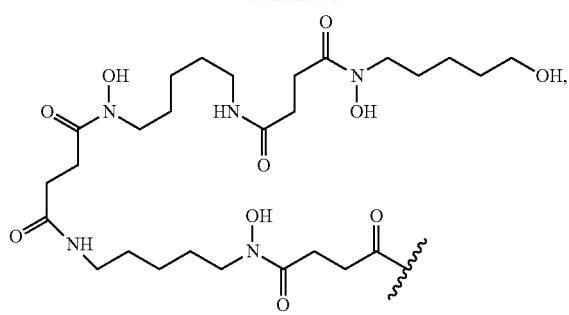
22
-continued
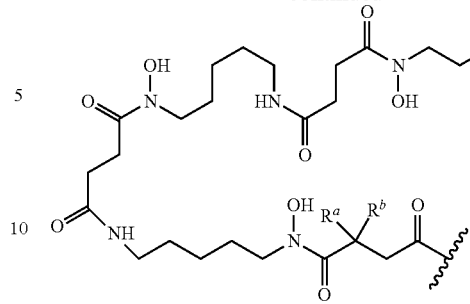
wherein Ra and Rb each independently hydrogen or $C_{1-4}$alkyl,
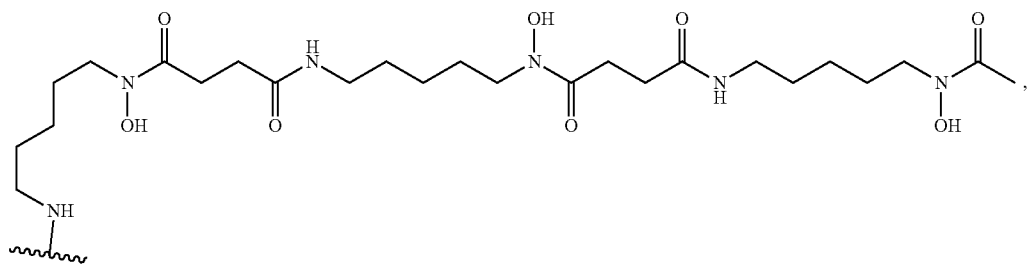
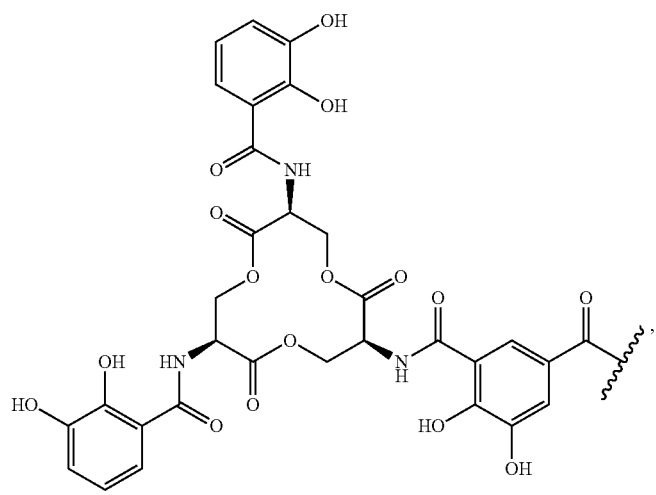

-continued
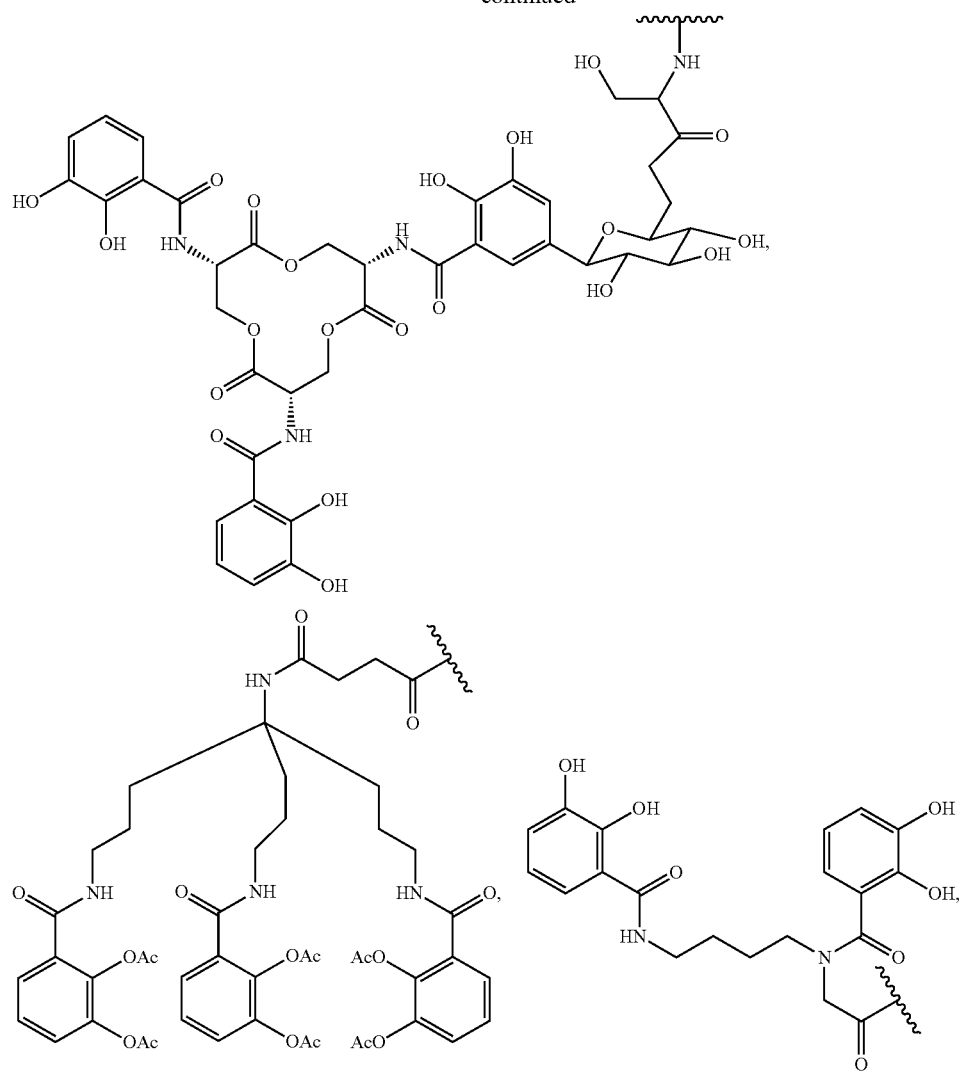
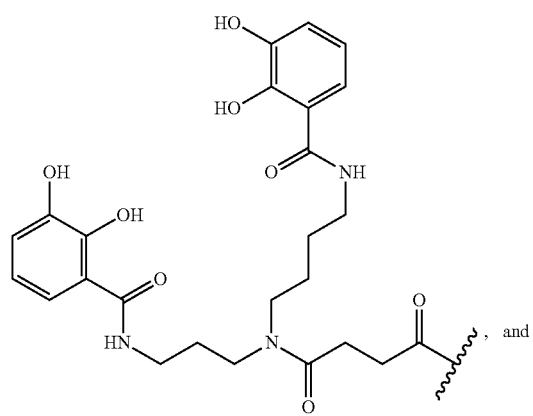

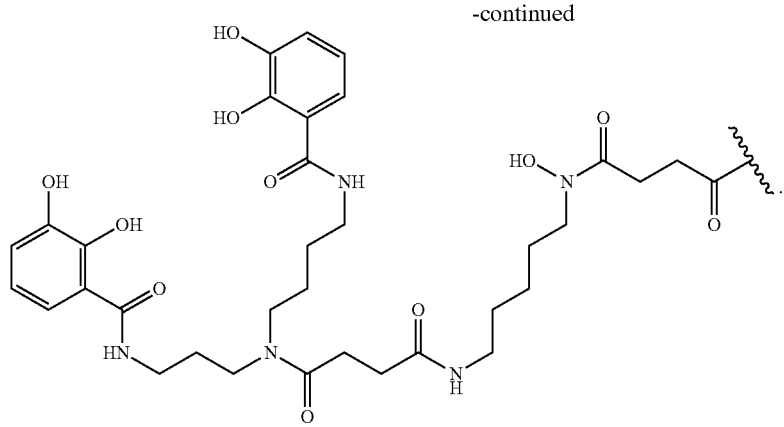

The "Drug" group as used in formula A refers to a group derived from the free form of a drug as described herein. Representative drugs that may be incorporated in formula A include, but are not limited to, amikacin, aminoglycoside, amoxicillin, amphotericin, ampicillin, ansamycin, azithromycin, aztreonam, bacillomycin, biapenem, carbacephalosporins, carbapenem, carbomycin, carbomycin A, carumonam, cefaclor, cefalotin, cephalosporin, cethromycin, chloramphenicol, chlortetracycline, ciprofloxacin, clarithromycin, clindamycin, cycloserine, daptomycin, demeclocycline, dirithromycin, doripenem, doxorubicin, doxycycline, ertapeneme, erythromycin, ethambutol, fluoroquinolone, gentamicin, isoniazid, josamycin, kanamycin, kitasamycin, lincomycin, linezolid, loracarbef, macrolide, meropenem, methacycline, midecamycin, monobactams, monocarbams, mupirocin, neomycin, nystatin, oleandomycin, oleandomycin, oxazolidinones, oxytetracycline, panipenem, penem, penicillin, peptide antibiotic, polymixin, pyrrolnitrin, quinolone, rhamoplanin, rifampin, rifamycins, rolitetracycline, roxithromycin, solithromycin, spiramycin, streptomycin, sulfabenzamide, sulfacetamide, sulfadiazine, sulfadoxine, sulfamerazine, sulfamethazine, sulfamethizole, sulfamethoxazole, sulfisoxazole, sulfonamide, teichoplanin, telithromycin, tetracycline, tigimonam, troleandomycin, tylosin, tylocine, and vancomycin.

In some embodiments, the compound of formula (I) is salt" refers to salts or zwitterions of the compounds which are water or oil-soluble or dispersible, suitable for treatment of disorders without undue toxicity, irritation, and allergic response, commensurate with a reasonable benefit/risk ratio and effective for their intended use. In some embodiments, the salts may be prepared during the final isolation and purification of the compounds or separately by reacting an amino group of the compounds with a suitable acid. Representative salts include acetate, adipate, alginate, citrate, aspartate, benzoate, benzenesulfonate, bisulfate, butyrate, camphorate, camphorsulfonate, digluconate, glycerophosphate, hemisulfate, heptanoate, hexanoate, formate, isethionate, fumarate, lactate, maleate, methanesulfonate, naphthylenesulfonate, nicotinate, oxalate, pamoate, pectinate, persulfate, 3-phenylpropionate, picrate, oxalate, maleate, pivalate, propionate, succinate, tartrate, thrichloroacetate, trifluoroacetate, glutamate, para-toluenesulfonate, undecanoate, hydrochloric, hydrobromic, sulfuric, phosphoric and the like.

Examples of pharmaceutically acceptable salts are organic acid addition salts formed with acids that form a physiological acceptable anion, for example, tosylate, methanesulfonate, acetate, citrate, malonate, tartrate, succinate, benzoate, ascorbate, α-ketoglutarate, and glycerophosphate. Suitable inorganic salts may also be formed, including hydrochloride, halide, sulfate, nitrate, bicarbonate, and carbonate salts.

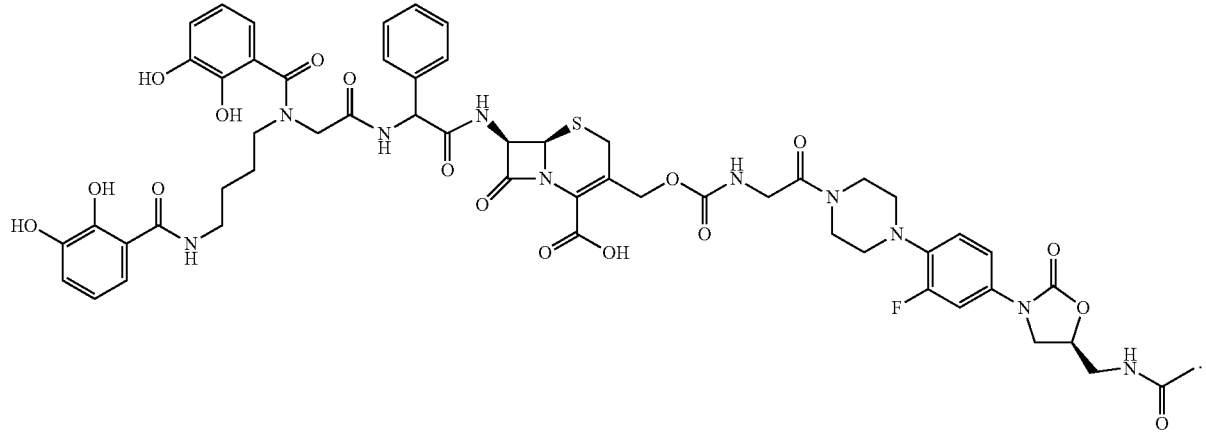 [SMILES: CC(=O)NC[C@H]1CN(c2ccc(N3CCN(C(=O)CNC(=O)OCC4=C(C(=O)O)N5C(=O)[C@@H](NC(=O)C(NC(=O)CN(CCCCNC(=O)c6cccc(O)c6O)C(=O)c6cccc(O)c6O)c6ccccc6)[C@H]5SC4)CC3)c(F)c2)C(=O)O1]

The disclosed compounds may exist as pharmaceutically acceptable salts. The term "pharmaceutically acceptable Basic addition salts may be prepared during the final isolation and purification of the disclosed compounds by reaction of a carboxyl group with a suitable base such as the hydroxide, carbonate, or bicarbonate of a metal cation such as lithium, sodium, potassium, calcium, magnesium, or aluminum, or an organic primary, secondary, or tertiary amine.

Pharmaceutically acceptable salts may be obtained using standard procedures well known in the art, for example by reacting a sufficiently basic compound such as an amine with a suitable acid to provide a physiologically acceptable ionic compound. Alkali metal (for example, sodium, potassium or lithium) or alkaline earth metal (for example, calcium) salts of carboxylic acids can also be prepared by analogous methods.

The amino groups of the compounds may also be quaternized with alkyl chlorides, bromides and iodides such as methyl, ethyl, propyl, isopropyl, butyl, lauryl, myristyl, stearyl and the like. Quaternary amine salts can be prepared, such as those derived from methylamine, dimethylamine, trimethylamine, triethylamine, diethylamine, ethylamine, tributylamine, pyridine, N,N-dimethylaniline, N-methylpiperidine, N-methylmorpholine, dicyclohexylamine, procaine, dibenzylamine, N,N-dibenzylphenethylamine, 1-ephenamine and N,N'-dibenzylethylenediamine, ethylenediamine, ethanolamine, diethanolamine, piperidine, piperazine, and the like.

3. Pharmaceutical Formulations

The compounds described herein can be used to prepare therapeutic pharmaceutical compositions, for example, by combining the compounds with a pharmaceutically acceptable diluent, excipient, or carrier. The compounds may be added to a carrier in the form of a salt or solvate. For example, in cases where compounds are sufficiently basic or acidic to form stable nontoxic acid or base salts, administration of the compounds as salts may be appropriate.

The compounds of the formulas described herein can be formulated as pharmaceutical compositions and administered to a mammalian host, such as a human patient, in a variety of forms. The forms can be specifically adapted to a chosen route of administration, e.g., oral or parenteral administration, by intravenous, intramuscular, topical or subcutaneous routes.

The compounds described herein may be systemically administered in combination with a pharmaceutically acceptable vehicle, such as an inert diluent or an assimilable edible carrier. For oral administration, compounds can be enclosed in hard or soft shell gelatin capsules, compressed into tablets, or incorporated directly into the food of a patient's diet. Compounds may also be combined with one or more excipients and used in the form of ingestible tablets, buccal tablets, troches, capsules, elixirs, suspensions, syrups, wafers, and the like. Such compositions and preparations typically contain at least 0.1% of active compound. The percentage of the compositions and preparations can vary and may conveniently be from about 0.5% to about 60%, about 1% to about 25%, or about 2% to about 10%, of the weight of a given unit dosage form. The amount of active compound in such therapeutically useful compositions can be such that an effective dosage level can be obtained.

The tablets, troches, pills, capsules, and the like may also contain one or more of the following: binders such as gum tragacanth, acacia, corn starch or gelatin; excipients such as dicalcium phosphate; a disintegrating agent such as corn starch, potato starch, alginic acid and the like; and a lubricant such as magnesium stearate. A sweetening agent such as sucrose, fructose, lactose or aspartame; or a flavoring agent such as peppermint, oil of wintergreen, or cherry flavoring, may be added. When the unit dosage form is a capsule, it may contain, in addition to materials of the above type, a liquid carrier, such as a vegetable oil or a polyethylene glycol. Various other materials may be present as coatings or to otherwise modify the physical form of the solid unit dosage form. For instance, tablets, pills, or capsules may be coated with gelatin, wax, shellac or sugar and the like. A syrup or elixir may contain the active compound, sucrose or fructose as a sweetening agent, methyl and propyl parabens as preservatives, a dye and flavoring such as cherry or orange flavor. Any material used in preparing any unit dosage form should be pharmaceutically acceptable and substantially non-toxic in the amounts employed. In addition, the active compound may be incorporated into sustained-release preparations and devices.

The active compound may be administered intravenously or intraperitoneally by infusion or injection. Solutions of the active compound or its salts can be prepared in water, optionally mixed with a nontoxic surfactant. Dispersions can be prepared in glycerol, liquid polyethylene glycols, triacetin, or mixtures thereof, or in a pharmaceutically acceptable oil. Under ordinary conditions of storage and use, preparations may contain a preservative to prevent the growth of microorganisms.

Pharmaceutical dosage forms suitable for injection or infusion can include sterile aqueous solutions, dispersions, or sterile powders comprising the active ingredient adapted for the extemporaneous preparation of sterile injectable or infusible solutions or dispersions, optionally encapsulated in liposomes. The ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions, or by the use of surfactants. The prevention of the action of microorganisms can be brought about by various antibacterial and/or antifungal agents, for example, parabens, chlorobutanol, phenol, sorbic acid, thimerosal, and the like. In many cases, it will be preferable to include isotonic agents, for example, sugars, buffers, or sodium chloride. Prolonged absorption of the injectable compositions can be brought about by agents delaying absorption, for example, aluminum monostearate and/or gelatin.

Sterile injectable solutions can be prepared by incorporating the active compound in the required amount in the appropriate solvent with various other ingredients enumerated above, as required, optionally followed by filter sterilization. In the case of sterile powders for the preparation of sterile injectable solutions, methods of preparation can include vacuum drying and freeze drying techniques, which yield a powder of the active ingredient plus any additional desired ingredient present in the solution.

For topical administration, compounds may be applied in pure form, e.g., when they are liquids. However, it will generally be desirable to administer the active agent to the skin as a composition or formulation, for example, in combination with a dermatologically acceptable carrier, which may be a solid, a liquid, a gel, or the like.

Useful solid carriers include finely divided solids such as talc, clay, microcrystalline cellulose, silica, alumina, and the like. Useful liquid carriers include water, dimethyl sulfoxide (DMSO), alcohols, glycols, or water-alcohol/glycol blends, in which a compound can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using a pump-type or aerosol sprayer.

Thickeners such as synthetic polymers, fatty acids, fatty acid salts and esters, fatty alcohols, modified celluloses, or modified mineral materials can also be employed with liquid carriers to form spreadable pastes, gels, ointments, soaps, and the like, for application directly to the skin of the user.

Examples of dermatological compositions for delivering active agents to the skin are known to the art; for example, see U.S. Pat. No. 4,992,478 (Geria), 4,820,508 (Wortzman), 4,608,392 (Jacquet et al.), and 4,559,157 (Smith et al.). Such dermatological compositions can be used in combinations with the compounds described herein where an ingredient of such compositions can optionally be replaced by a compound described herein, or a compound described herein can be added to the composition Useful dosages of the compounds described herein can be determined by comparing their in vitro activity, and in vivo activity in animal models. Methods for the extrapolation of effective dosages in mice, and other animals, to humans are known to the art; for example, see U.S. Pat. No. 4,938,949 (Borch et al.). The amount of a compound, or an active salt or derivative thereof, required for use in treatment will vary not only with the particular compound or salt selected but also with the route of administration, the nature of the condition being treated, and the age and condition of the patient, and will be ultimately at the discretion of an attendant physician or clinician.

The compound can be conveniently administered in a unit dosage form, for example, containing 5 to 1000 mg/m$^2$, conveniently 10 to 750 mg/m$^2$, most conveniently, 50 to 500 mg/m$^2$ of active ingredient per unit dosage form. The desired dose may conveniently be presented in a single dose or as divided doses administered at appropriate intervals, for example, as two, three, four or more sub-doses per day. The sub-dose itself may be further divided, e.g., into a number of discrete loosely spaced administrations.

The compounds described herein can be effective antimicrobial agents, for example, against various microbes that cause infection. The invention provides therapeutic methods of treating bacterial infections in a mammal, which involve administering to a mammal having an infection an effective amount of a compound or composition described herein. A mammal includes a primate, human, rodent, canine, feline, bovine, ovine, equine, swine, caprine, bovine and the like.

The ability of a compound of the invention to kill a microbe or bacteria, to inhibit its growth, and/or to treat a related infection may be determined by using assays well known to the art. For example, the design of treatment protocols, toxicity evaluation, data analysis, quantification of cell kill, and the biological significance of the use of various screens are known. In addition, ability of a compound to treat an infection may be determined using the Tests described below.

4. Method of Use

The disclosed compounds may function as dual drug sideromycin agents, which is active against Gram-negative bacteria, regardless of whether the bacteria produce any β-lactamase enzymes. Advantageously, the disclosed compounds may simultaneously circumvent multiple resistance mechanisms (such as alteration of microbial permeability and destruction of antibiotics by bacterial β-lactamases) and provide an unexpectedly effective treatment method against bacterial infection, including those caused by Gram-negative bacteria. By this approach, antibiotics that are traditionally only effective against Gram-positive bacteria (such as oxazolidinone) may be rendered effective against Gram-negative bacteria (such as *Acinetobacter baumannii*).

As a representative compound, the siderophore-cephalosporin-oxazolidinone conjugate (1) disclosed herein (FIG. 1) is active against not only Gram-negative bacteria that do not express significant amounts of β-lactamase (due to their susceptibility to cephalosporin), but also Gram-negative bacteria that produce large amounts of ADC-1 β-lactamase (e.g., clinical isolates of *Acinetobacter baumannii*) as a result of the release of oxazolidinone. Thus, while intending to protect itself with a cephalosporinase, the targeted bacteria unwittingly induce their suicide.

Remarkably, the siderophore-cephalosporin-oxazolidinone conjugate (1) circumvents multiple known resistance mechanisms by siderophore-mediated active uptake promoting inherent activity of the delivered antibiotic combination. Furthermore, β-lactamase induced destructive hydrolysis of the cephalosporin component initiates intracellular release of the oxazolidinone warhead (3) thus allowing this normally Gram positive only class of antibiotics to be effective against targeted Gram-negative bacteria, including cephalosporinase-producing *Acinetobacter baumannii*.

The disclosed compounds and compositions may be used in various methods including methods of treatment and prevention of a bacterial infection comprising administering to a subject in need thereof an effective amount of a compound of formula (I), or a pharmaceutically acceptable salt or pharmaceutical composition thereof.

The disclosed compounds and compositions may be used to inhibit bacterial growth, for example, by contacting an effective amount of the compound or composition with a bacterium.

The disclosed compounds and compositions may also be used as an anti-bacterial agent in in vitro or ex vivo methods, e.g. in methods of cell culture or where the compound is used in the context of an abiotic or inanimate setting, e.g. to treat an inanimate surface to prevent, inhibit or reduce bacterial colonization and/or growth, e.g. for decontamination, antiseptic, or sterilization purposes, or is applied to or contacted with a surface material, substrate, product, device or system susceptible to microbial growth, e.g. contamination such as in the preparation of a medical device of implant.

In one aspect, provided is a method of treating bacterial infection, comprising administering to a subject infected by a bacterium an effective amount of a compound of formula (I), or a pharmaceutically acceptable salt thereof.

In another aspect, is provided a method of killing or inhibiting the growth of a bacterium, comprising contacting the bacterium with an effective amount of a compound of formula (I), or a pharmaceutically acceptable salt thereof.

In some embodiments, the bacterium is Gram-positive bacterium or a Gram-negative bacterium.

The bacterium may be a gram positive bacterial agent selected from the group comprising, but not limited to, *Staphylococcus* spp, *Streptococcus* spp, *Enterococcus* spp, *Leuconostoc* spp, *Corynebacterium* spp, Arcanobacteria spp, Trueperella spp, *Rhodococcus* spp, *Bacillus* spp, Anaerobic Cocci, Anaerobic Gram-Positive Nonsporulating Bacilli, *Actinomyces* spp, *Clostridium* spp, *Nocardia* spp, *Erysipelothrix* spp, *Listeria* spp, Kytococcus spp, *Mycoplasma* spp, *Ureaplasma* spp, and *Mycobacterium* spp.

In some embodiments, the bacterium is a Gram-negative bacterium. The bacterium may be a gram negative bacterial agent selected from the group comprising the following representative families: Acetobacteraceae, Aeromonadaceae, Alcaligenaceae, Anaplasmataceae, Armatimonadaceae, Bacteroidaceae, Bartonellaceae, Bdellovibrionaceae, Brachyspiraceae, Brucellaceae, Burkholderiaceae, Campylobacteraceae, Candidatus, Cardiobactenaceae, Chlamydiaceae, Chthonomonadaceae, Comamonadaceae, Coxiellaceae, Cytophagaceae, Desulfovibrionaceae, Enterobacteriaceae, Fimbriimonadaceae, Flavobacteriaceae, Francisellaceae, Fusobacteriaceae, Helicobacteraceae, Legionelaceae, Leptospiraceae, Leptotrichiaceae, Methylobacteriaceae, Moraxellaceae, Moritellaceae, Neisseriacae, Nitrosomonadaceae, Pasteurellaceae, Piscirickettsiaceae, Plesiomonadaceae, Polyangiaceae, Porphyromonadaceae, Prevotellaceae, Pseudomonadaceae, Rhizobiaceae, Rickettsiaceae, Shewanellaceae, Sphingomonadaceae, Spirillaceae, Spirochaetaceae, Succinivibrionaceae, Sutterellaoeae, Thermaceae, Thermotogaceae, Veillonellaceae, Vibrionaceae, Wolbachieae, and Xanthomonadaceae.

In some embodiments, the bacterium is *Acinetobacter*, *Pseudomonas*, Enterobacteria, or combinations thereof. In some embodiments, the bacterium is *Pseudomonas aeruginosa*. In some embodiments, the bacterium is *Acinetobacter baumannii*.

In some embodiments, the bacterium is an antibiotic-resistant bacterium. In general, an antibiotic-resistant bacterium as used herein refers to a bacterium that causes an infection and is resistant to conventional antibiotic treatments. For example, the bacteria may be resistant to a compound selected from the group comprising: one or more of aminoglycosides; aminocyclitols; anti-MRSA cephalosporins; antipseudomonal penicillins+β-lactamase inhibitors; carbapenems; non-extended spectrum cephalosporins; 1st and 2nd generation cephalosporins; extended-spectrum cephalosporins; 3rd and 4th generation cephalosporins; cephamycins; fluoroquinolones; folate pathway inhibitors; fusidanes, glycylcyclines; lincosamides; macrolides and ketolides; monobactams; oxazolidinones; penicillins; penicillins+β-lactamase; phenicols; phosphonic acids; pleuromutilins; polymyxins; rifamycins; streptogramins; sulphonamides; tetracyclines. In some embodiments, the bacterium is a multidrug resistant bacterium.

In some embodiments, the bacterium produces a β-lactamase. β-Lactamases are a class of enzymes that make bacteria resistant to β-lactam antibiotics. β-Lactamases cleave the 0-lactam ring of β-lactam antibiotics, such as penicillins, cephalosporins, cephamycins, and carbapenems.

In some embodiments, the infection is caused by *Acinetobacter*, *Pseudomonas*, Enterobacteria, or combinations thereof. In some embodiments, the infection is caused by *Acinetobacter baumannii*.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

6. Examples

The compounds described herein may be synthesized and characterized according to the representative procedures described below.

General Methods. All solvents and reagents were obtained from commercial sources and used without further purification unless otherwise stated. Silica gel (230-400 mesh) was purchased from Silicycle, Quebec City, Canada. All compounds are >98% pure by HPLC analysis, and MIC values reported are the average of three individual measurements. All compounds were analyzed for purity by HPLC and characterized by $^1$H and $^{13}$C NMR using Bruker 400 MHz, 500 MHz NMR, and/or Varian 600 MHz NMR spectrometers. Chemical shifts are reported in ppm (δ) relative to the residual solvent peak in the corresponding spectra, and coupling constants (J) are reported in hertz (Hz). The mass spectra values are reported as m/z, and ultrahigh pressure liquid chromatography mass spectrometry (UPLCMS) analyses of the reaction of 1 with ADC-1 were carried out with a Bruker MicrOTOF-QII, quadrupole time-of-flight mass spectrometer coupled via electrospray ionization with a Dionex Ultimate 3000 RSLC system. A 20 minute binary gradient separation on a Zorbax® RX—C8 narrow bore 2.1×150 mm 5 micron column kept at 37 C was run under the following conditions: solvent A=water with 0.1% formic acid, solvent B=acetonitrile with 0.1% formic acid, A:B=90:10 for 2 minutes followed by a 16 minute linear ramp to A:B 0:100 before returning to initial conditions for 2 minutes. Additional liquid chromatography mass spectrum (LC/MS) analyses were carried out on a Waters ZQ instrument consisting of chromatography module Alliance HT, photodiode array detector 2996, and mass spectrometer Micromass ZQ, using a 3×50 mm Pro C18 YMC reverse phase column. Mobile phases: 10 mM ammonium acetate in HPLC grade water (A) and HPLC grade acetonitrile (B). A gradient was formed from 5% to 80% of B in 10 min at 0.7 mL/min. The MS electrospray source operated at capillary voltage 3.5 kV and a desolvation temperature of 300° C. Reverse phase chromatographic purification was performed on a Waters 1525 Binary pump equipped with a Waters 2998 Photodiode Array Detector, Waters 2707 Autosampler, and Water Fraction Collector III utilizing Empower 3 Chromatography Manager software (Waters, Milford, MA, USA). A Waters SymmetryPrep C18 7 μm OBD column (300×7.8 mm) was used for separation. DAD was detected at 254 nm at 20° C., eluting with a linear gradient of 0.5-20% acetonitrile in 0.1% aqueous TFA (flow rate 5 mL/min).

Example 1. Preparation of
Siderophore-Cephalosporin-Oxazolidinone (1)

A specific siderophore-cephalosporin-oxazolidinone (1) was designed to test siderophore-mediated dual drug delivery and β-lactamase triggered release of an oxazolidinone to Gram-negative bacteria. The synthesis of (1) involved access to all three components, the siderophore, an appropriately functionalized cephalosporin and an oxazolidinone with suitable pendant functionality for coupling to the cephalosporin moiety. As shown in Schemes 1 and 2, the primary alcohol of commercially available eperezolid (17) was converted to the mesylate which was then displaced with potassium phthalimide to provide protected amine (18). Standard deprotection with MeNH$_2$ provided oxazolidinone (3) with a free amine for subsequent reaction with an appropriately activated cephalosporin (21). Cephalosporin (21) was prepared in four steps from readily available 3-aminocephalosporanic acid (19). Thus, (19) was first converted to the t-butyl ester by BF$_3$-catalyzed reaction with t-butylacetate. D-Phenylglycine, a common side chain in cephalosporins, including cefaclor, was protected with a Boc group and then coupled to the free amine of the t-butyl cephalosporinate. Finally, the 3'-acetoxy group was removed enzymatically using *Candida* lipase B to give protected cephalosporin (20) with a free 3'-hydroxyl group. Reaction of the hydroxyl group with 1,2,2,2-tetrachloroethyl carbonochloridate gave the isolable activated cephalosporin (21). Treatment of cephalosporin carbonate (21) with aminooxazolidinone (3) followed by reaction with TFA to remove the Boc group and t-butyl ester gave cephalosporin oxazolidinone (22).

Scheme 1. Synthesis of siderophore conjugates.

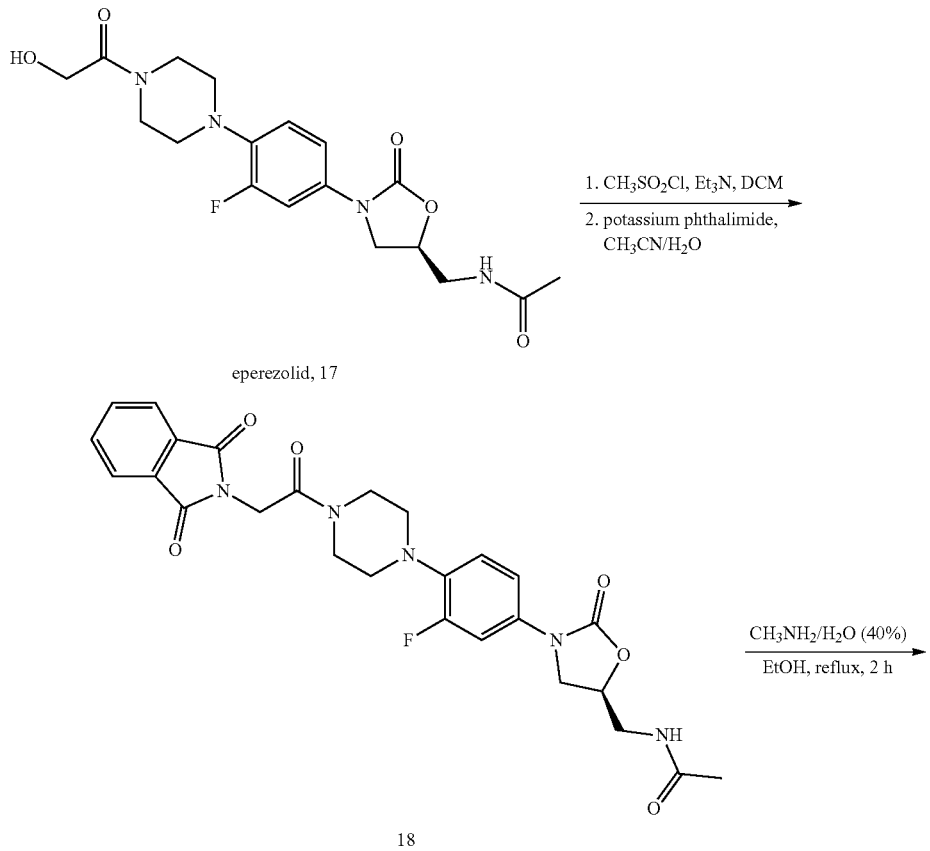

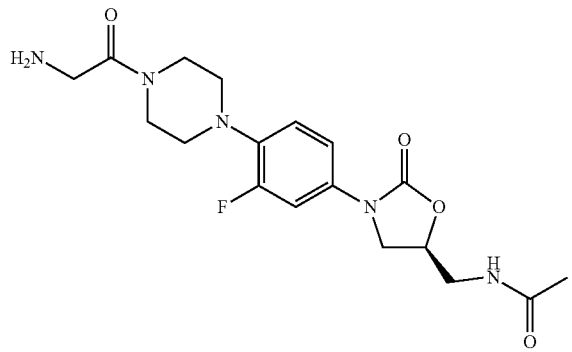

-continued
Scheme 2. Synthesis of siderophore conjugates
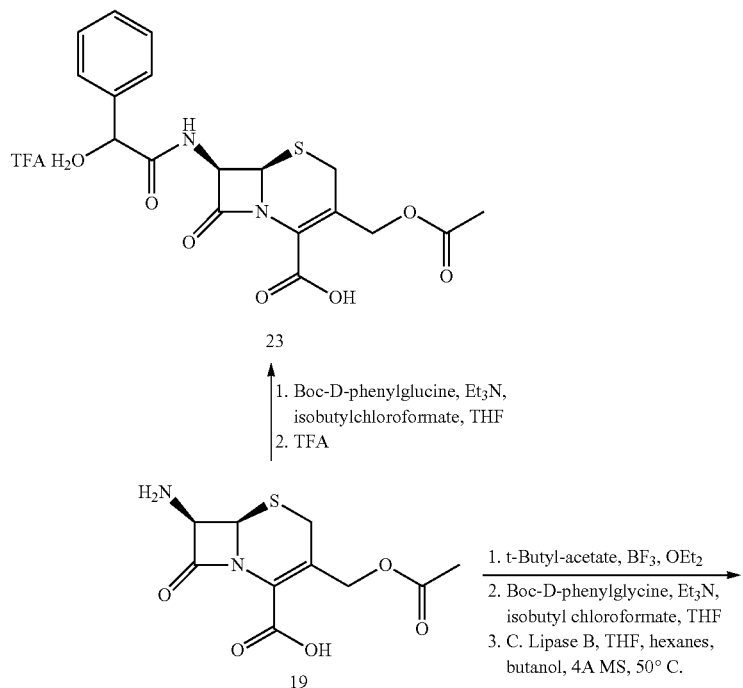
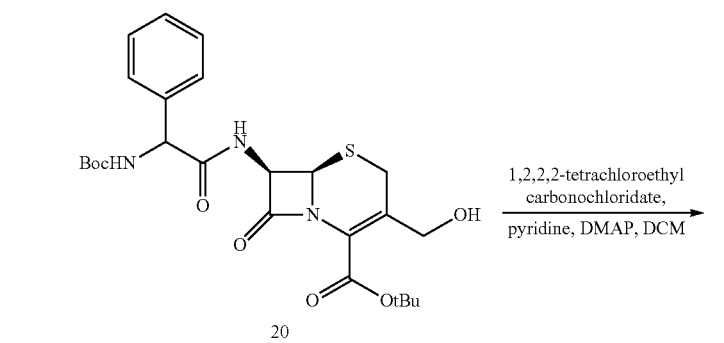
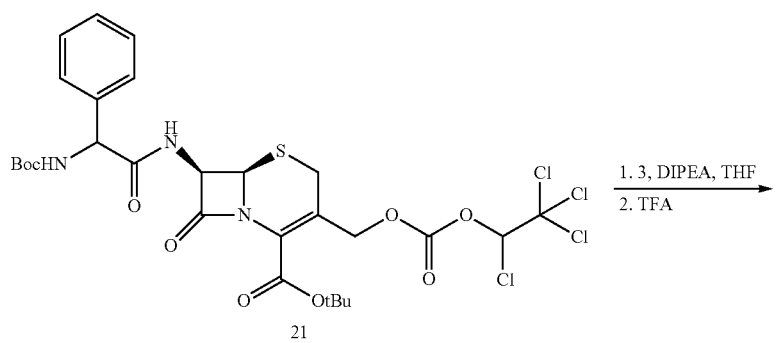

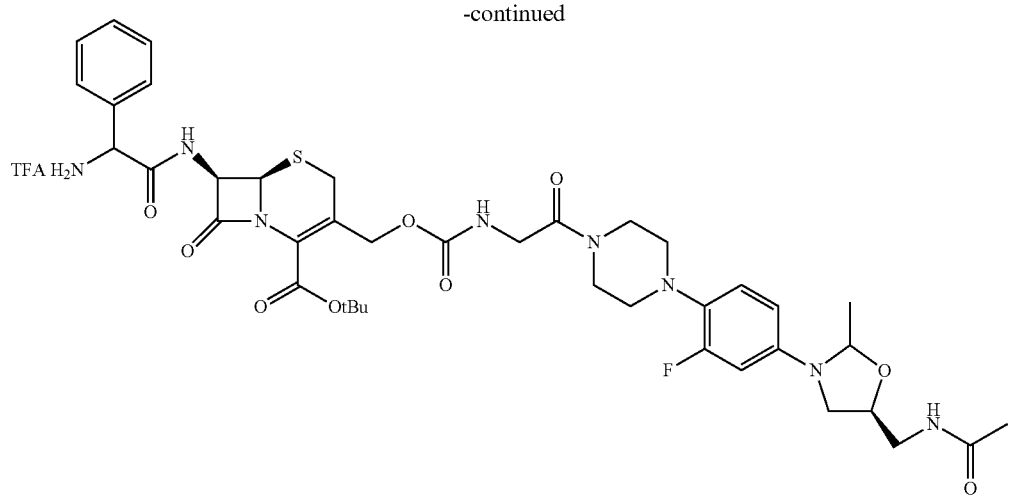

22

As shown in Scheme 3, protected bis-catechol (24) was first saponified to give the free acid which was hydrogenolytically debenzylated and then treated with EDC/NHS to give active ester (25). Direct reaction of the active ester with cephalosporin oxazolidinone (22) gave the final conjugate (1). Separate coupling of the activated siderophore with D-phenylglycyl cephalosporin (23) and aminooxazolidinone (3) gave the corresponding siderophore-cephalosporin (26) and siderophore-oxazolidinone (27) conjugates for use as controls in subsequent bioassays.

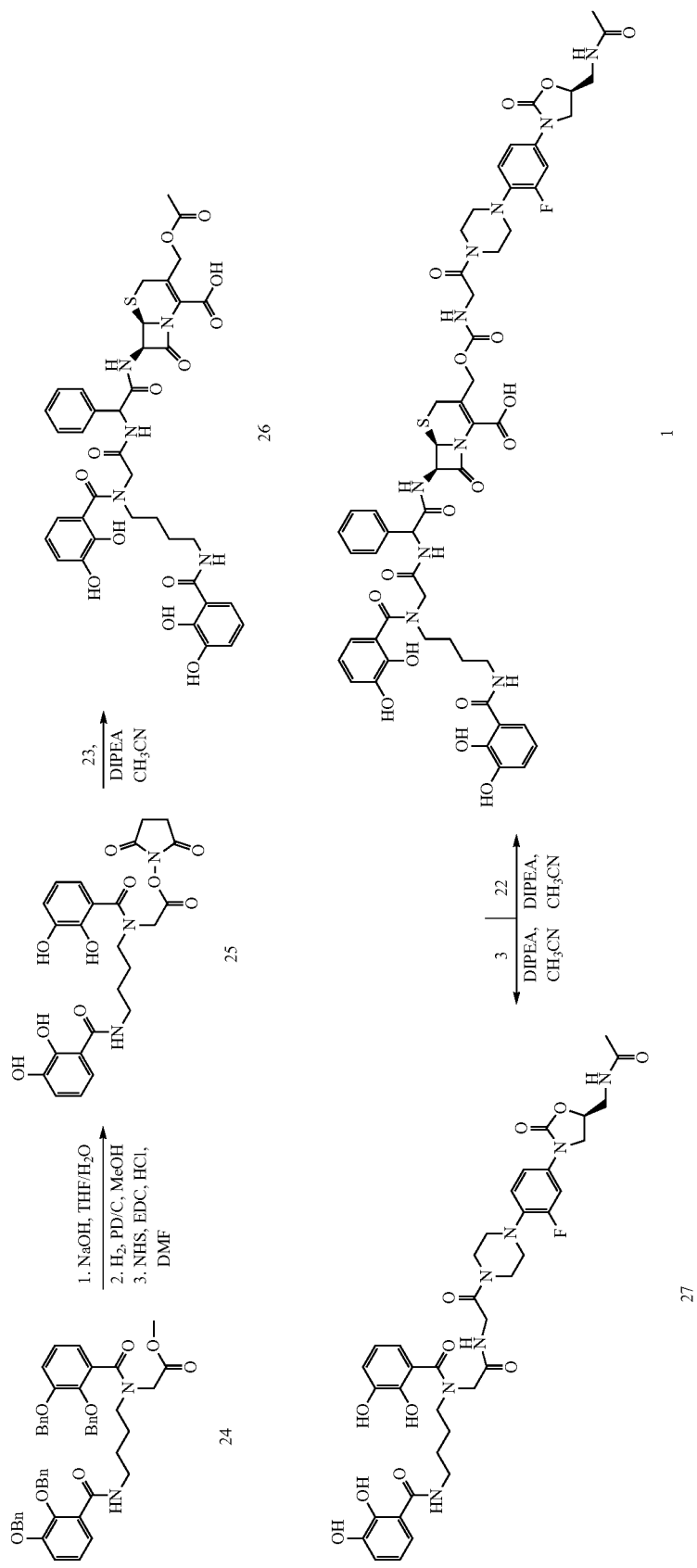
Scheme 3. Synthesis of siderophore conjugates.

(S)—N-((3-(4-(4-(2-(1,3-Dioxoisoindolin-2-yl)acetyl)piperazin-1-yl)-3-fluorophenyl)-2-oxooxazolidin-5-yl)methyl)acetamide (18)

To a solution of Eperezolid (17) (394 mg, 1 mmol) and Et$_3$N (418 µL, 3 mmol) in 20 mL of anhydrous DCM at 0° C. was added methanesulfonyl chloride (155 µL, 2 mmol) dropwise. The mixture was then stirred at 0° C. for 1 h and then at room temperature for 1 h. When the starting material was disappeared, the mixture was washed with 100 mL water, and the aqueous layer was extracted with DCM (30 mL). The combined organic layers were dried with Na$_2$SO$_4$, filtered, then concentrated under reduced pressure to give the corresponding mesylate as a yellow foamy solid (472 mg, 1 mmol) which was used directly without further purification. $^1$H NMR (400 MHz, DMSO-d$_6$): δ 1.83 (s, 3H), 2.96-3.00 (m, 4H), 3.07-3.14 (m, 1H), 3.27 (s, 3H), 3.40 (t, 2H, J=8.0 Hz), 3.51-3.62 (m, 4H), 3.69-3.72 (m, 1H), 4.08 (t, 1H, J=8.0 Hz), 4.69-4.73 (m, 1H), 5.07 (s, 1H), 7.08 (t, 1H, J=8.0 Hz), 7.18-7.20 (m, 1H), 7.48-7.53 (m, 1H), 8.24 (t, 1H, J=4.0 Hz). $^{13}$C NMR (400 MHz, DMSO-d$_6$): δ 23.13, 38.48, 42.12, 43.78, 44.77, 46.52, 48.02, 50.80-51.01, 67.43, 72.25, 107.21-107.47, 114.83, 120.59, 134.44, 135.83, 154.14, 154.75, 164.51, 170.68. LC/MS (m/z): [m+H]$^+$ calcd for C$_{19}$H$_{26}$FN$_4$O$_7$S, 473.15; found, 473.29; retention time: 4.30 min.

To a solution of the mesylate in CH$_3$CN (50 mL) and H$_2$O (0.25 mL) was added potassium phthalimide (556 mg, 3 mmol) and then the reaction was refluxed for 48 h. After the reaction was complete as monitored by TLC, it was filtered to remove the solid, and the solvent was concentrated under reduced pressure. The residue was purified by silica gel column, eluting with DCM/MeOH (100/1, v/v) to give (S)—N-((3-(4-(4-(2-(1,3-Dioxoisoindolin-2-yl)acetyl)piperazin-1-yl)-3-fluorophenyl)-2-oxooxazolidin-5-yl)methyl)acetamide (18) as a white solid in 59% yield (308 mg, 0.59 mmol). $^1$H NMR (400 MHz, DMSO-d$_6$): δ 1.83 (s, 3H), 2.96 (brs, 2H), 3.06 (brs, 2H), 3.40 (t, 2H, J=8.0 Hz), 3.60 (brs, 2H), 3.69-3.72 (m, 3H), 4.09 (t, 1H, J=8.0 Hz), 4.59 (s, 2H), 4.68-4.74 (m, 1H), 7.11 (t, 1H, J=8.0 Hz), 7.18-7.20 (m, 1H), 7.49 (dd, 1H, J$_1$=4 Hz, J$_2$=16 Hz), 7.87-7.94 (m, 4H), 8.24 (t, 1H, J=8.0 Hz). $^{13}$C NMR (400 MHz, DMSO-d$_6$): δ 23.14, 42.13, 42.41, 44.92, 48.02, 50.84, 51.30, 72.26, 107.20-107.46, 114.81, 120.61-120.65, 123.96, 132.38, 134.47-134.57, 135.38, 135.87-135.96, 154.18, 154.75, 156.60, 164.87, 168.31, 170.68. LC/MS (m/z): [m+H]$^+$ calcd for C$_{26}$H$_{27}$FN$_5$O$_6$, 524.19; found, 524.35; retention time: 5.53 min.

(S)—N-((3-(3-Fluoro-4-(4-glycylpiperazin-1-yl)phenyl)-2-oxooxazolidin-5-yl)methyl)acetamide (3)

A mixture of 18 (0.59 mmol, 308 mg) and 0.52 mL of 40% methylamine in water (5.9 mmol, 10 eq) and 30 mL of EtOH was heated at reflux for 3 h. When the starting material 18 was consumed, the mixture was concentrated under reduced pressure and the residue was purified using a silica gel column, eluting with DCM/MeOH (5/1, v/v) to give (S)—N-((3-(3-Fluoro-4-(4-glycylpiperazin-1-yl)phenyl)-2-oxooxazolidin-5-yl)methyl)acetamide (3) as a yellow foamy solid in 43% yield (99 mg, 0.25 mmol). $^1$H NMR (400 MHz, DMSO-d$_6$): δ 1.81 (s, 3H), 2.94-2.98 (m, 4H), 3.38 (t, 2H, J=8.0 Hz), 3.65-3.70 (m, 4H), 3.91-3.92 (m, 2H), 4.06 (t, 2H, J=8.0 Hz), 4.67-4.71 (m, 1H), 7.06 (t, 1H, J=8.0 Hz), 7.16-7.19 (m, 1H), 7.47 (d, 1H, J=12 Hz), 8.05 (brs, 2H), 8.24 (t, 1H, J=8.0 Hz). $^{13}$C NMR (400 MHz, DMSO-d$_6$): δ 23.13, 42.12, 42.27, 44.88, 48.03, 50.83, 51.07, 72.27, 107.25-107.51, 114.86, 120.59, 134.52-134.62, 135.74-135.83, 154.16, 154.76, 156.58, 165.33, 170.70. LC/MS (m/z): [m+H]$^+$ calcd for C$_{18}$H$_{25}$FN$_5$O$_4$, 394.19; found, 394.25; retention time: 1.23 min.

tert-Butyl (6R,7R)-7-(2-((tert-butoxycarbonyl)amino)-2-phenylacetamido)-3-(hydroxymethyl)-8-oxo-5-thia-1-azabicyclo[4.2.0]oct-2-ene-2-carboxylate (20)

To a flame dried pressure tube under argon was added t-butyl acetate (18.5 mL, 138 mmol). Argon was bubbled through the t-butyl acetate for 5 min and compound 19 (1.00 g, 3.67 mmol) was added. To this suspension was added BF$_3$·Et$_2$O (2.8 mL, 22.0 mmol), the tube was capped, and the reaction was stirred until homogeneous (~1.25 h). The reaction was poured into 50 mL of stirring ice water and the organic layer was removed. The aqueous layer was washed with EtOAc/hexanes (1:1, v/v) and this organic layer was also discarded. The aqueous layer was transferred to a flask, placed in an ice bath, and EtOAc (75 mL) was added. To this stirring suspension was slowly added Na$_2$CO$_3$ until the pH was 8.5. The organic layer was removed and the aqueous layer was extracted with EtOAc (3 times). The pooled organic layers were dried with Na$_2$SO$_4$, filtered, and concentrated under reduced pressure to give a yellow oil that was stirred in EtOAc/hexanes (1:10, v/v) for 10 min. Most of the solvent was decanted and the product was dried under reduced pressure to give the t-butyl ester as a light-yellow solid in 68% yield (822 mg, 2.5 mmol). $^1$H NMR (400 MHz, DMSO-d$_6$): δ 1.49 (s, 9H), 2.02 (s, 3H), 2.28 (s, 2H), 3.40 (d, 1H, J=20 Hz), 3.56 (d, 1H, J=20 Hz), 4.59 (d, 1H, J=12 Hz), 4.79 (s, 1H), 4.87 (d, 1H, J=12 Hz), 4.98 (d, 1H, J=4 Hz). $^{13}$C NMR (400 MHz, DMSO-d$_6$): δ 21.25, 26.00, 28.11, 59.90, 63.41, 64.46, 83.15, 122.66, 127.74, 161.42, 170.68, 170.89.

A solution of Boc-D-phenylglycine (126 mg, 0.5 mmol) and Et$_3$N (70 µL, 0.5 mmol) in THF (10 mL) was cooled to −10° C. While stirring, 65 µL (0.5 mmol) isobutyl chloroformate was added and the temperature was maintained at −10° C. for 10 min. A cold solution of the t-butyl ester in 3 mL of THF was added with stirring to the mixed anhydride solution. The mixture was stirred at 5° C. for 1 h and then at room temperature for 1 h. When the reaction was finished, as monitored by TLC, the THF was evaporated and the residue was purified using a silica gel column eluting with hexanes/EtOAc (4:1, v/v) to give tert-Butyl (6R,7R)-3-(acetoxymethyl)-7-(2-((tert-butoxycarbonyl)amino)-2-phenylacetamido)-8-oxo-5-thia-1-azabicyclo[4.2.0]oct-2-ene-2-carboxylate as a white solid in 77% yield (216 mg, 0.38 mmol). H NMR (400 MHz, DMSO-d$_6$): δ 1.39 (s, 9H), 1.47 (s, 9H), 2.01 (s, 3H), 3.42 (d, 1H, J=20 Hz), 3.55 (d, 1H, J=20 Hz), 4.61 (d, 1H, J=12 Hz), 4.89 (d, 1H, J=12 Hz), 5.04 (d, 1H, J=4 Hz), 5.35 (d, 1H, J=8 Hz), 5.73 (brs, 1H), 7.29-7.44 (m, 5H), 9.17-9.18 (d, 1H, J=4 Hz). $^{13}$C NMR (400 MHz, DMSO-d$_6$): δ 21.21, 26.32, 28.10, 28.86, 58.07, 58.31, 59.43, 63.22, 79.16, 83.46, 122.89, 127.52, 127.91, 128.33, 128.40, 128.87, 129.02, 138.75, 155.58, 161.01, 164.91, 170.81, 171.73. LC/MS (m/z): [M−H]$^+$ calcd for C$_{27}$H$_{34}$N$_3$O$_8$S, 560.20; found, 560.36; retention time: 8.88 min.

To an Erlenmeyer flask was added tert-butyl (6R,7R)-3-(acetoxymethyl)-7-(2-((tert-butoxycarbonyl)amino)-2-phenylacetamido)-8-oxo-5-thia-1-azabicyclo[4.2.0]oct-2-ene-2-carboxylate (0.2 mmol, 112 mg), 1 mL of THF, and 10 mL of hexanes. The flask was swirled to give a suspension. To this suspension was added CAB Lipase (44 mg), 4 A molecular sieves (90 mg) and s-butanol (0.37 mL). The flask was stopped with a septum (with a small air vent) and the reaction was shaken in an incubated shaker at 50° C. for 3-4 days. The reaction was diluted with DCM and filtered using vacuum filtration. The filtrate was concentrated under reduced pressure to give 20 as a white solid in 85% yield (88 mg, 0.17 mmol). $^1$H NMR (400 MHz, DMSO-$d_6$): δ 1.39 (s, 9H), 1.47 (s, 9H), 3.39-3.50 (m, 2H), 4.11-4.21 (m, 2H), 4.98 (d, 1H, J=4 Hz), 5.04 (brs, 1H), 5.34 (d, 1H, J=8 Hz), 5.66-5.69 (m, 1H), 7.27-7.44 (m, 5H), 9.14 (d, 1H, J=8 Hz). $^{13}$C NMR (400 MHz, DMSO-$d_6$): δ 26.05, 28.18, 28.86, 58.02, 58.30, 59.20, 60.53, 79.14, 82.85, 124.42, 127.89, 128.30, 128.86, 138.80, 155.63, 161.49, 164.79, 171.74. LC/MS (m/z): [M−H]$^+$ calcd for $C_{25}H_{32}N_3O_7S$, 518.19; found, 518.20; retention time: 7.72 min.

tert-Butyl (6R,7R)-7-(2-((tert-butoxycarbonyl) amino)-2-phenylacetamido)-8-oxo-3-((((1,2,2,2-tetrachloroethoxy)carbonyl)oxy)methyl)-5-thia-1-azabicyclo[4.2.0]oct-2-ene-2-carboxylate (21)

To a solution of compound 20 (0.1 mmol, 52 mg) in anhydrous DCM at room temperature was added 1,2,2,2-tetrachloroethyl carbonochloridate (0.11 mmol, 17 µL), pyridine (0.13 mmol, 11 µL) and 2 mg of DMAP. The mixture was stirred for 2 h. When the starting material was consumed based on TLC analysis, the reaction was concentrated under reduced pressure. The residue was dissolved in 1 mL of EtOAc, and the crude compound, 21, was precipitated as a light pink solid in 77% yield by adding 5 mL of hexanes. tert-Butyl (6R,7R)-7-(2-((tert-butoxycarbonyl) amino)-2-phenylacetamido)-8-oxo-3-((((1,2,2,2-tetrachloroethoxy)carbonyl)oxy)methyl)-5-thia-1-azabicyclo[4.2.0] oct-2-ene-2-carboxylate (21) was used directly for the next step without further purification.

(6R,7R)-3-((((2-(4-(4-((S)-5-(Acetamidomethyl)-2-oxooxazolidin-3-yl)-2-fluorophenyl)piperazin-1-yl)-2-oxoethyl)carbamoyl)oxy)methyl)-7-(2-amino-2-phenylacetamido)-8-oxo-5-thia-1-azabicyclo[4.2.0]oct-2-ene-2-carboxylic acid (22)

To a solution of 3 (0.1 mmol, 39 mg) in anhydrous THF (3 mL) was added DIPEA (0.2 mmol, 34 µL) at room temperature. The mixture was stirred for 2 min, then a solution of crude 21 (0.1 mmol, 73 mg) in THF (2 mL) was added. The reaction was stirred at room temperature for 6 h. After evaporation, the residue was purified using a silica gel column eluting with DCM/MeOH (40:1, v/v) to give the corresponding protected cephalosporin oxazolidinone as a white solid in 50% yield (0.05 mmol, 47 mg). $^1$H NMR (400 MHz, DMSO-$d_6$): δ 1.39 (s, 9H), 1.47 (s, 9H), 1.81 (s, 3H), 2.93 (d, 4H, J=12 Hz), 3.40-3.70 (m, 5H), 3.89 (brs, 2H), 4.08 (t, 1H, J=8.0 Hz), 4.56-4.61 (m, 1H), 4.70 (s, 1H), 4.84 (d, 1H, J=8.0 Hz), 5.03 (s, 1H), 5.33 (s, 1H), 5.71 (brs, 1H), 7.07 (t, 1H, J=8.0 Hz), 7.17 (d, 1H, J=4.0 Hz), 7.27-7.31 (m, 2H), 7.43-7.51 (m, 5H), 8.17 (s, 1H), 8.24 (s, 1H), 9.16 (s, 1H). $^{13}$C NMR (400 MHz, DMSO-$d_6$): δ 23.13, 26.78, 28.14, 28.86, 42.12, 42.70, 44.72, 48.01, 50.93, 51.28, 58.30, 59.40, 63.30, 72.25, 79.18, 83.43, 107.20-107.46, 114.81, 120.50, 124.02, 126.98, 127.91, 128.22, 128.87, 129.88, 134.40-134.51, 135.90-135.99, 137.05, 138.75, 154.14, 154.75, 156.56-156.92, 161.05, 164.90, 167.77, 169.27, 170.68, 171.74. LC/MS (m/z): [M+H]$^+$ calcd for $C_{44}H_{56}FN_8O_{12}S$, 939.37; found, 939.61; retention time: 7.72 min.

To 5 mL of anhydrous trifluoroacetic acid at room temperature was added 40 mg of the white solid from the last step (0.04 mmol) with stirring. After 30 min, pouring the reaction solution into anhydrous ether afforded the trifluoroacetic salt of (6R,7R)-3-((((2-(4-(4-((S)-5-(Acetamidomethyl)-2-oxooxazolidin-3-yl)-2-fluorophenyl)piperazin-1-yl)-2-oxoethyl)carbamoyl)oxy)methyl)-7-(2-amino-2-phenylacetamido)-8-oxo-5-thia-1-azabicyclo[4.2.0]oct-2-ene-2-carboxylic acid (22) (30 mg, 0.03 mmol) as a white solid in 75% yield. $^1$H NMR (500 MHz, DMSO-$d_6$): δ 1.83 (s, 3H), 2.92-2.96 (m, 4H), 3.40 (brs, 2H), 3.48-3.59 (m, 5H), 3.70 (t, 2H, J=8.0 Hz), 3.87 (d, 2H, J=4.0 Hz), 4.08 (t, 1H, J=8.0 Hz), 4.62 (d, 1H, J=16.0 Hz), 4.71 (t, 1H, J=8.0 Hz), 4.93 (d, 1H, J=12.0 Hz), 5.04 (d, 2H, J=4.0 Hz), 5.78 (t, 1H, J=8.0 Hz), 7.07 (t, 1H, J=12.0 Hz), 7.17 (d, 1H, J=4.0 Hz), 7.28 (t, 1H, J=4.0 Hz), 7.43-7.52 (m, 5H), 8.12 (brs, 1H), 8.27 (brs, 1H), 8.78 (brs, 2H), 9.56 (d, 1H, J=8.0 Hz). $^{13}$C NMR (400 MHz, DMSO-$d_6$): δ 23.12, 25.98, 42.11, 42.69, 44.68, 50.93, 51.24, 56.03, 57.88, 59.32, 63.39, 72.23, 107.21-107.47, 114.82, 120.53, 125.37, 126.37, 128.45, 129.43, 130.00, 134.14, 134.40-134.50, 135.90-135.99, 154.14, 154.76, 156.57-156.99, 158.63-158.94, 163.38, 164.41, 165.33, 167.78, 168.93, 170.72. LC/MS (m/z): [M+H]$^+$ calcd for $C_{35}H_{40}FN_8O_{10}S$, 782.25; found, 783.41; retention time: 4.17 min.

(6R,7R)-3-(Acetoxymethyl)-7-(2-(2-(N-(4-(2,3-dihydroxybenzamido)butyl)-2,3-dihydroxybenzamido) acetamido)-2-phenylacetamido)-8-oxo-5-thia-1-azabicyclo[4.2.0]oct-2-ene-2-carboxylic acid (26)

Compound 23 was synthesized according to the literature reported method (Spencer, et al., *J. Med. Chem.*, 1966, 9, 746-760). To a suspension of 23 (0.1 mmol, 50 mg) in anhydrous acetonitrile (5 mL), was added diisopropylethylamine (0.2 mmol, 35 µL) at room temperature. To this mixture was added a DMF solution of 25 (0.1 mmol) and the mixture was stirred for 4 h. The reaction was then concentrated under reduced pressure. The residue was purified using a $C_{18}$ reverse phase silica gel column, eluting with a gradient of water and acetonitrile to give (6R,7R)-3-(Acetoxymethyl)-7-(2-(2-(N-(4-(2,3-dihydroxybenzamido) butyl)-2,3-dihydroxybenzamido)acetamido)-2-phenylacetamido)-8-oxo-5-thia-1-azabicyclo[4.2.0]oct-2-ene-2-carboxylic acid (26) as a white solid in 12% yield (0.012 mmol, 10 mg). $^1$H NMR (500 MHz, DMSO-$d_6$): δ 1.23-1.32 (m, 2H), 1.45-1.56 (m, 2H), 2.01 (s, 3H), 3.09-3.17 (m, 2H), 3.30-3.54 (m, 4H), 3.92-3.94 (m, 1H), 4.17-4.20 (m, 1H), 4.64 (d, 1H, J=10 Hz), 4.95-5.02 (m, 2H), 5.59-5.71 (m, 2H), 6.46-6.77 (m, 5H), 6.87-6.90 (m, 1H), 7.22-7.31 (m, 5H), 7.46 (brs, 1H), 8.62-8.80 (m, 2H), 9.12 (s, 1H), 9.36-9.49 (m, 2H), 12.79 (d, 1H, J=50.0 Hz), 13.73 (s, 1H). $^{13}$C NMR (500 MHz, DMSO-$d_6$): δ 20.37, 25.42, 25.83, 28.44, 28.83, 47.47, 48.74, 55.69, 57.37, 58.67, 62.52, 114.94, 115.68, 115.89, 117.03, 117.45, 117.69, 117.83, 118.62, 119.17, 123.34, 126.20, 126.72, 126.91, 127.54, 128.10, 137.79, 141.25, 145.21, 146.05, 149.53, 162.59, 164.11, 168.13, 169.20, 169.56, 170.00, 170.30. HRMS (m/z): [M+Na]$^+$ calcd for $C_{38}H_{39}N_5NaO_{13}S$, 828.2167; found, 828.2157.

(S)—N-(2-((2-(4-(4-(5-(Acetamidomethyl)-2-oxooxazolidin-3-yl)-2-fluorophenyl)piperazin-1-yl)-2-oxoethyl)amino)-2-oxoethyl)-N-(4-(2,3-dihydroxybenzamido)butyl)-2,3-dihydroxybenzamide (27)

To a suspension of 3 (0.1 mmol, 39 mg) in anhydrous acetonitrile (5 mL), was added diisoprpylethylamine (0.2 mmol, 35 μL) at room temperature. To this mixture was added a DMF solution of 25 (0.1 mmol) and the mixture was stirred for 4 h. The reaction was then concentrated under reduced pressure. The residue was purified using a $C_{18}$ reverse phase silica gel column, eluting with a gradient of water and acetonitrile to give (S)—N-(2-((2-(4-(4-(5-(Acetamidomethyl)-2-oxooxazolidin-3-yl)-2-fluorophenyl)piperazin-1-yl)-2-oxoethyl)amino)-2-oxoethyl)-N-(4-(2,3-dihydroxybenzamido)butyl)-2,3-dihydroxybenzamide (27) (0.01 mmol, 8 mg) as a white solid in 10% yield. $^1$H NMR (500 MHz, DMSO-d$_6$): δ 1.23-1.32 (m, 2H), 1.48-1.58 (m, 2H), 1.83 (s, 3H), 2.93-2.98 (m, 4H), 3.11-3.20 (m, 2H), 3.38-3.52 (m, 4H), 3.58 (s, 4H), 3.69 (dd, 1H, $J_1$=10.0 Hz, $J_2$=5.0 Hz), 3.86-3.96 (m, 2H), 4.06-4.14 (m, 2H), 4.67-4.73 (m, 1H), 6.58-6.67 (m, 3H), 6.77 (dd, 1H, $J_1$=20.0 Hz, $J_2$=10.0 Hz), 6.89 (d, 1H, J=5.0 Hz), 7.06 (brs, 1H), 7.16 (d, 1H, J=10.0 Hz), 7.21-7.30 (m, 1H), 7.49 (dd, 1H, $J_1$=15.0 Hz, $J_2$=5.0 Hz), 8.06 (s, 1H), 8.24 (t, 1H, J=5.0 Hz), 8.67 (t, 1H, J=15.0 Hz), 8.80-8.97 (m, 1H), 9.13 (s, 1H), 9.53 (s, 1H), 12.77 (d, 1H, J=55.0 Hz). $^{13}$C NMR (500 MHz, DMSO-d$_6$): δ 23.12, 24.82, 25.97, 26.56, 26.89, 29.70, 39.10, 39.46, 41.24, 42.08, 44.78, 45.33, 47.95, 48.16, 49.44, 50.89, 51.19, 51.55, 72.22, 107.15-107.36, 114.74, 115.58, 116.28, 116.61, 117.75, 118.25, 118.51, 118.67, 119.40, 119.96, 120.15, 120.48, 125.22, 125.66, 134.37-134.45, 135.88-135.95, 141.92, 145.95, 146.88, 150.38, 154.34, 154.73, 156.28, 158.44, 158.81, 167.33, 169.30, 169.93, 170.37, 170.69. HRMS (m/z): [M+Na]$^+$ calcd for $C_{38}H_{44}FN_7NaO_{11}$, 816.2982; found, 816.2975.

(6R,7R)-3-((((2-(4-(4-((S)-5-(Acetamidomethyl)-2-oxooxazolidin-3-yl)-2-fluorophenyl)piperazin-1-yl)-2-oxoethyl)carbamoyl)oxy)methyl)-7-(2-(2-(N-(4-(2,3-dihydroxybenzamido)butyl)-2,3-dihydroxybenzamido)acetamido)-2-phenylacetamido)-8-oxo-5-thia-1-azabicyclo[4.2.0]oct-2-ene-2-carboxylic acid (1)

To a suspension of 22 (0.1 mmol, 88 mg) in anhydrous acetonitrile (5 mL), was added diisoprpylethylamine (0.2 mmol, 35 μL) at room temperature. To this mixture was added a DMF solution of 25 (0.1 mmol) and the mixture was stirred for 4 h. The reaction was then concentrated under reduced pressure. The residue was purified using a $C_{18}$ reverse phase silica gel column, eluting with a gradient of water and acetonitrile to give (6R,7R)-3-((((2-(4-(4-((S)-5-(Acetamidomethyl)-2-oxooxazolidin-3-yl)-2-fluorophenyl)piperazin-1-yl)-2-oxoethyl)carbamoyl)oxy)methyl)-7-(2-(2-(N-(4-(2,3-dihydroxybenzamido)butyl)-2,3-dihydroxybenzamido)acetamido)-2-phenylacetamido)-8-oxo-5-thia-1-azabicyclo[4.2.0]oct-2-ene-2-carboxylic acid (1) (0.01 mmol, 11 mg) as a white solid in 10% yield. H NMR (500 MHz, DMSO-d$_6$): δ 1.23-1.29 (m, 3H), 1.46-1.56 (m, 3H), 1.83 (s, 3H), 2.92-2.96 (m, 4H), 3.08-3.16 (m, 2H), 3.40 (t, 2H, J=5 Hz), 3.5-3.59 (m, 4H), 3.68-3.71 (m, 1H), 3.87-3.93 (m, 2H), 4.08 (t, 1H, J=10 Hz), 4.14-4.19 (m, 1H), 4.57-4.71 (m, 2H), 4.84 (s, 1H), 4.94-5.12 (m, 2H), 5.46 (s, 1H), 5.59 (s, 1H), 5.70 (brs, 1H), 6.46-6.77 (m, 5H), 6.87-6.90 (m, 1H), 7.07 (t, 1H, J=10 Hz), 7.17-7.29 (m, 5H), 7.46-7.52 (m, 2H), 8.01 (s, 1H), 8.24 (t, 1H, J=4 Hz), 8.64 (brs, 2H), 8.80-8.83 (m, 1H), 9.07-9.11 (m, 1H), 9.40-9.48 (m, 2H), 12.79-12.90 (m, 1H), 13.64 (brs, 1H). $^{13}$C NMR (500 MHz, DMSO-d$_6$): δ 22.30, 24.68, 25.26, 41.34, 41.92, 43.93, 47.26, 50.12, 50.42, 55.43, 57.39, 58.66, 62.62, 71.40, 106.50, 110.04, 113.65, 114.06, 117.02, 117.40, 117.64, 118.00, 119.73, 124.71, 125.70, 126.72, 126.99, 127.35, 128.05, 133.60, 135.13, 138.02, 149.83, 150.90, 151.06, 151.16, 153.74, 153.92, 155.19, 155.36, 155.95, 156.14, 157.79, 158.00, 162.60, 164.14, 166.95, 168.86, 169.06, 169.85, 170.47. HRMS (m/z): [M+Na]$^+$ calcd for $C_{55}H_{59}FN_{10}NaO_{17}S$, 1205.3665; found, 1205.3656.

Example 2 Enzymatic Hydrolysis Experiments

With the final siderophore-cephalosporin-oxazolidinone conjugate (1) along with the separate cephalosporin and oxazolidinone conjugates (26 and 27) as well as the corresponding cephalosporin (23), oxazolidinone (3) and eperezolid (17) available, enzymatic and anti-bacterial assays were performed to test the susceptibility of conjugate (1) to the hydrolytic activity of β-lactamases from Gram-negative bacteria. Thus, assays were conducted to evaluate whether the oxazolidinone could be efficiently released from the final siderophore-cephalosporin-oxazolidinone conjugate (1) as a result of cephalosporin hydrolysis by a β-lactamase. For this purpose, one of the ADC-type β-lactamases (ADC-1) was chosen as ADC enzymes are intrinsic to A. baumannii, an important clinical pathogen, and are capable of hydrolyzing cephalosporin antibiotics.

The ADC-1 β-lactamase was expressed and purified as previously described (Bhattacharya et al., Acta Crystallogr., Sect. D: Biol. Crystallogr., 2014, 70, 760-771). Conjugate 1 (10 mM in DMSO) was diluted 5-fold in DMSO and then another 10-fold in 50 mM sodium phosphate, pH 7.4 to give a 200 μM solution with 10% DMSO. Subsequently, a 60 μL reaction was prepared consisting of 20 μM of 1 (6 μL of a 200 μM solution) and 20 μM ADC-1 β-lactamse (8.1 μL of 148 μM enzyme) in 50 mM sodium phosphate, pH 7.4 (the final concentration of DMSO was 1%). The reaction was incubated at room temperature for 40 min prior to analysis by LC/MS. Two control reactions, one containing only 1 (20 μM) and the other only ADC-1 (1 μM enzyme), were also prepared using the same conditions. FIG. 5 shows that incubation of the purified ADC-1 with conjugate (1) resulted in its rapid and complete hydrolysis and release of the oxazolidinone, as determined by LC/MS.

Example 3. Antimicrobial Susceptibility Assays

Next, assays were conducted to test whether the siderophore-cephalosporin-oxazolidinone conjugate (1) exhibits antimicrobial activity against A. baumannii producing the ADC-1 β-lactamase. For this purpose, A. baumannii ATCC 17978, which produces a small amount of the chromosomally-encoded enzyme, and the same strain that produces a large amount of ADC-1 from the pNT255 vector were used (Table 1).

The gene encoding the ADC-1 enzyme from A. baumannii with its leader (GenBank accession number NG_048633.1) was custom synthesized (GenScript) and cloned into the NdeI-HindIII restriction sites of the pNT255 shuttle vector, which is a derivative of the pNT221 shuttle vector in which the ISAba3 promoter sequence has been replaced with that of ISAbal Smith et al., Chem. Biol., 2013, 20, 1107-1115). To remove two HindIII sites within the ADC-1 nucleotide sequence, silent mutations were made using the codon usage of A. baumannii. This plasmid was then introduced by electroporation into A. baumannii ATCC 17978 for MIC measurements. MIC analyses were performed using iron depleted media as described previously (Ghosh, J. Med. Chem., 2017, 60, 4577-4583).

As shown in Table 1, the non-conjugated oxazolidinones (3 and 17) themselves as well as the cephalosporin-oxazolidinone (22) and simple cephalosporin (23) were not active against this strain of A. baumannii, due to inadequate delivery or efflux. The siderophore-oxazolidinone (27, with a non-releasable linkage between the transport agent and antibiotic component) also was not active, suggesting that without release from the siderophore, the oxazolidione either could not reach its target or was not recognized by its target. The siderophore-cephalosporin (26) was remarkably active against *A. baumannii* producing a low amount of ADC-1. Dual conjugate, 1, retained similarly potent activity which indicates that activity of both compounds (26 and 1) is due to the cephalosporin. The dramatic improvement in MICs (more than 125-fold) of the cephalosporin or cephalosporin-oxazolidinone when conjugated to the siderophore indicates that the antibiotics are very efficiently delivered inside the bacterial cell.

cantly decreased the MIC (at least 8-fold) when compared to the siderophore-cephalosporin. These results are consistent with the scenario in which cleavage of the cephalosporin by the ADC-1 β-lactamase results in release of the oxazolidinone that can then reach its target, perhaps minimize the influence of efflux pumps and allow the oxazolidinone to exert a lethal effect on targeted Gram-negative bacteria.

Subsequently, the activities of the disclosed compounds were evaluated against four clinical isolates of *A. baumannii* (ATCC 17961, ATCC BAA1793, ATCC BAA1797 and ATTC BAA1800). All four *A. baumannii* isolates were

TABLE 1

Activity (in μM) of tested compounds against *A. baumannii* ATCC 17978 without and with plasmid-encoded β-lactamase.

| | 3 oxazolidinone | 17 eperezolid | 27 siderophore + oxazolidinone | 22 cephalosporin + oxazolidinone | 23 cephalosporin | 26 siderophore + cephalosporin | 1 siderophore + cephalosporin + oxazolidinone |
|---|---|---|---|---|---|---|---|
| *A. baumannii* ATCC 17978 | >500 | >50 | >50 | >50 | >50 | 0.4 | 0.4 |
| *A. baumannii* ATCC 17978 pNT255 | >500 | >50 | >50 | >50 | >50 | 0.4 | 0.4 |
| *A. baumannii* ATCC 17978 pNT225:ADC-1 | >500 | >50 | >50 | >50 | >50 | >50 | 6 |

When the production of the enzyme was significantly increased by the introduction of the plasmid-encoded β-lactamase (pNT255:adcl), this *A. baumannii* was rendered highly resistant to the siderophore-cephalosporin (26), an indication that large amounts of ADC-1 protected bacteria by hydrolyzing the incoming cephalosporin antibiotic, as anticipated from our studies that showed that the isolated ADC enzyme rapidly hydrolyzed the cephalosporin component. Addition of the oxazolidinone warhead to the siderophore-cephalosporin to result in final conjugate 1 signifiresistant to compounds 3, 22, 23, and 27. Strain ATCC 17961 was susceptible to both 26 and 1, indicating lack of or low β-lactamase content and/or activity. Conjugate 26, with the cephalosporin alone, had detectable activity against two clinical isolates (ATCC BAA1793 and 1800). Notably, the final siderophore-cephalosporin-oxazolidinone conjugate 1 was very active against all of the clinical isolates, especially the siderophore-cephalopsorin (26) resistant clinical strain ATCC BAA 1797 (Table 2).

TABLE 2

Activity (in μM) of compounds against *A. baumannii* and other bacteria tested.

| | 3 oxazolidinone | 22 cephalosporin + oxazolidinone | 23 cephalosporin | 27 siderophore + oxazolidinone | 26 siderophore + cephalosporin | 1 siderophore + cephalosporin + oxazolidinone |
|---|---|---|---|---|---|---|
| *A. baumannii* ATCC 17961 | >50 | >50 | >50 | >50 | 0.8 | 0.8 |
| *A. baumannii* ATCC BAA 1793 | >50 | >50 | >50 | >50 | 12.5 | 0.8-1.6 |
| *A. baumannii* ATCC BAA 1797 | >50 | >50 | >50 | >50 | >50 | 6.25 |
| *A. baumannii* ATCC BAA 1800 | >50 | >50 | >50 | >50 | 25 | 0.8 |
| *E. coli* DC0 | >50 | >50 | 50 | >50 | <0.025 | <0.025 |
| *P. aeruginosa* KW799/wt | >50 | >50 | >50 | >50 | 0.4 | 0.2-0.4 |

Further studies with two other Gram-negative bacteria (*Escherichia coli* DCO and *Pseudomonas aeruginosa* KW799) revealed that non-conjugated oxazolidinone 3, cephalosporin-oxazolidinone 22, cephalosporin 23, or the siderophore-oxazolidinone 27 were not active against the *E. coli* and *Pseudomonas aeruginosa* tested. However, the siderophore-cephalosporin (26, MIC: <0.025 M vs *E. coli* DC0 and 0.4 M vs *P. aeruginosa* KW799/wt) and siderophore-cephalosporin-oxazolidinone (1, MIC: <0.025 M vs *E. coli* DC0 and 0.2-0.4 μM vs *P. aeruginosa* KW799/wt) were remarkably active.

Overall, these results are consistent with siderophore-mediated active transport that facilitates uptake of the cephalosporin (conjugate 26) to improve its activity relative to the cephalosporin (23) itself. The lack of activity of the siderophore-oxazolidinone conjugate (27) reflects previous studies discussed earlier that indicate cytoplasmic targets do not tolerate intact conjugates to other drugs without releasable linkers. Notably, the activity and cephalosporinase susceptibility of the final siderophore-cephalosporin-oxazolidinone conjugate (1) is consistent with siderophore-mediated active uptake, inherent activity of the delivered dual drug and, in the presence of β-lactamase, intracellular release of the oxazolidinone upon cleavage of the cephalosporin to allow the freed oxazolidinone to inactivate its target. The final result demonstrates that oxazolidinone antibiotics are active against Gram-negative bacteria when they are efficiently delivered to their target. Importantly, conjugate (1) was demonstrated to be effective in treating β-lactamase producing *A. baumannii*, which is a pathogen of major concern world-wide.

These studies demonstrate that β-lactams, and cephalosporins in particular, can serve as β-lactamase-triggered releasable linkers to allow intracellular delivery Gram-positive of antibiotics to Gram-negative bacteria and thereby provide new methods to inhibit proliferation of multi-drug resistant bacteria The foregoing discussion discloses and describes merely exemplary embodiments of the invention. One skilled in the art will readily recognize from such discussion and from the accompanying drawings and claims, that various changes, modifications and variations can be made therein without departing from the spirit and scope of the invention as defined in the following claims.

The invention claimed is:

1. A compound of formula (I):

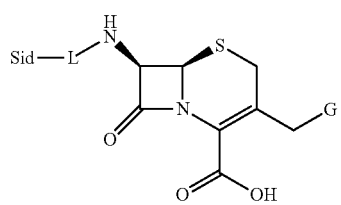

(I)

or a pharmaceutically acceptable salt thereof, wherein
Sid is a siderophore moiety selected from the group consisting of

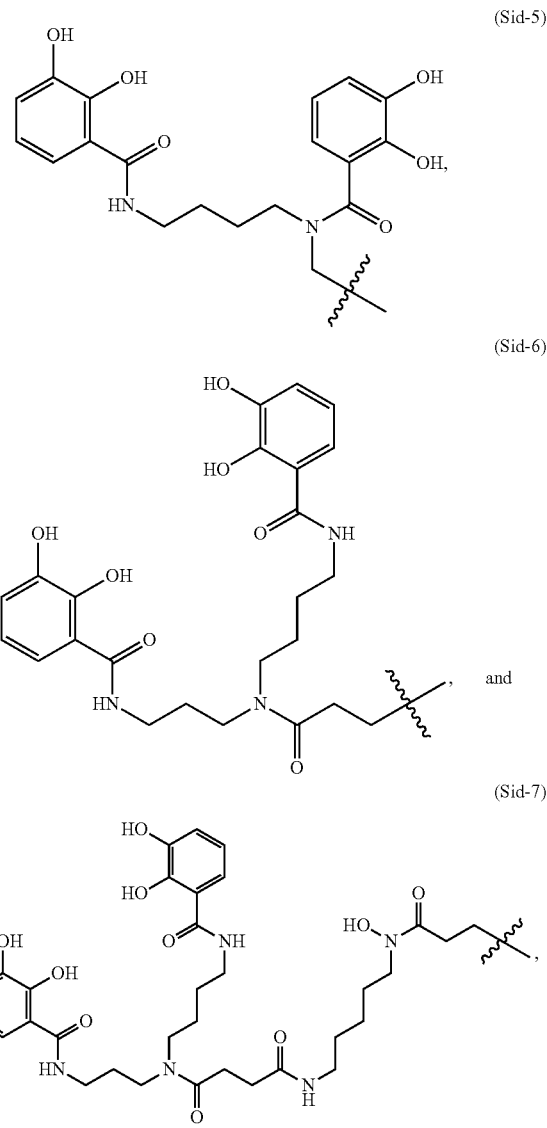

L is a bond, —C(O)—, —C(O)NHCH(R¹)—C(O)—, —C(O)OCH(R²)—C(O)—, or

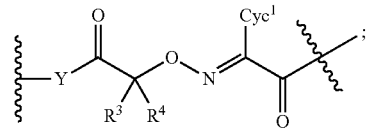

R¹ and R² are each hydrogen, $C_{1-6}$alkyl, cyano, $C_{3-6}$cycloalkyl, $C_{3-6}$cycloalkenyl, 6- to 12-membered aryl, or 5- to 12-membered heteroaryl, wherein the $C_{3-6}$cycloalkyl, $C_{3-6}$cycloalkenyl, 6- to 12-membered aryl, or 5- to 12-membered heteroaryl is optionally substituted with 1-5 substituents independently selected from the group consisting of halogen, $C_{1-4}$alkyl, $C_{1-4}$ haloalkyl, —$OC_{1-4}$alkyl, —$OC_{1-4}$haloalkyl, OH, oxo, and cyano;

R³ and R⁴ are each independently hydrogen, $C_{1-6}$alkyl, or R and R⁴ together with the C atom to which they are attached form a 3- to 8-membered ring;

Cyc¹ is a 6- to 12-membered aryl or 5- to 12-membered heteroaryl, wherein the 6- to 12-membered aryl or 5- to 12-membered heteroaryl is optionally substituted with 1-5 substituents independently selected from the group consisting of halogen, $C_{1-4}$alkyl, $C_{1-4}$haloalkyl, —$OC_{1-4}$alkyl, —$OC_{1-4}$haloalkyl, OH, oxo, and cyano;

Y is O or NH;

G is -G¹ or —X—$(CH_2)_p$C(O)-G¹;

X is O or S;

p is 0, 1, 2, 3, 4, or 5; and

G¹ is a drug moiety attached through an oxygen or nitrogen atom, a wherein G¹ is an oxazolidinone antibiotic.

2. The compound of claim 1, or a pharmaceutically acceptable salt thereof, wherein L is bond, —C(O)—, or —C(O)NHCH(R¹)—C(O)—.

3. The compound of claim 1, or a pharmaceutically acceptable salt thereof, wherein L is —C(O)NHCH(R¹)—C(O)—.

4. The compound of claim 1, or a pharmaceutically acceptable salt thereof, wherein R¹ is phenyl.

5. The compound of claim 1, or a pharmaceutically acceptable salt thereof, wherein L is

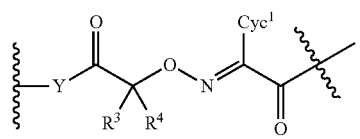

6. The compound of claim 1, or a pharmaceutically acceptable salt thereof, wherein R³ and R⁴ are each independently hydrogen or $C_{1-6}$alkyl.

7. The compound of claim 1, or a pharmaceutically acceptable salt thereof, wherein R³ and R⁴ together with the C atom to which they are attached form a 3- to 8-membered ring.

8. The compound of claim 1, or a pharmaceutically acceptable salt thereof, wherein R³ and R⁴ together with the C atom to which they are attached form

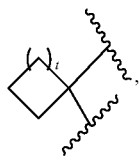

wherein t is 0, 1, 2, 3, 4, or 5.

9. The compound of claim 1, or a pharmaceutically acceptable salt thereof, wherein Cyc¹ is

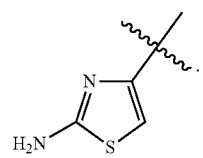

10. The compound of claim 1, or a pharmaceutically acceptable salt thereof, wherein Y is NH.

11. The compound of claim 1, or a pharmaceutically acceptable salt thereof, wherein G is G¹.

12. The compound of claim 1, or a pharmaceutically acceptable salt thereof, wherein G is —OC(O)-G¹.

13. The compound of claim 1, or a pharmaceutically acceptable salt thereof, wherein L is bond, —C(O)—, or —C(O)NHCH(R¹)—C(O)—, R¹ is phenyl; and G is G¹ or —OC(O)-G¹.

14. The compound of claim 1, or a pharmaceutically acceptable salt thereof, wherein G¹ is

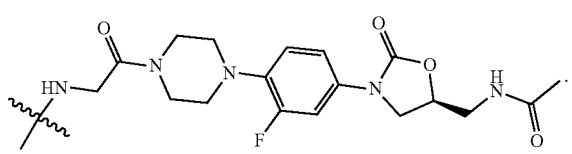 [SMILES: *NCC(=O)N1CCN(c2ccc(N3C[C@H](CNC(C)=O)OC3=O)cc2F)CC1]

15. A compound of formula (A):

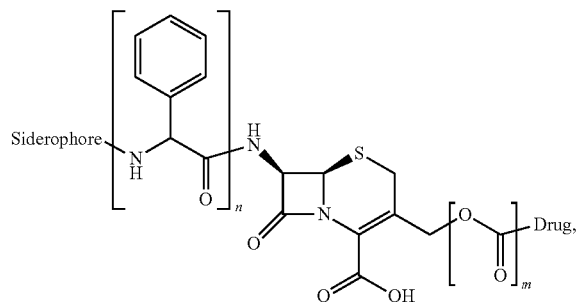

wherein

Siderophore is selected from the group consisting of

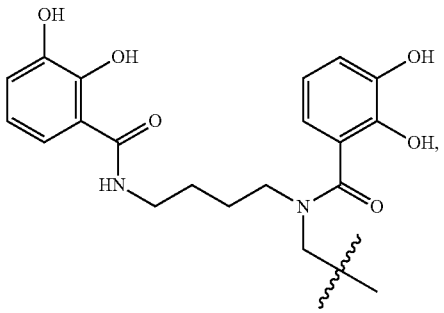

(Sid-5)

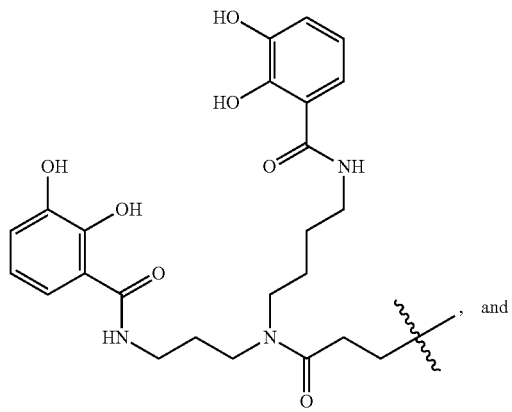

(Sid-6)

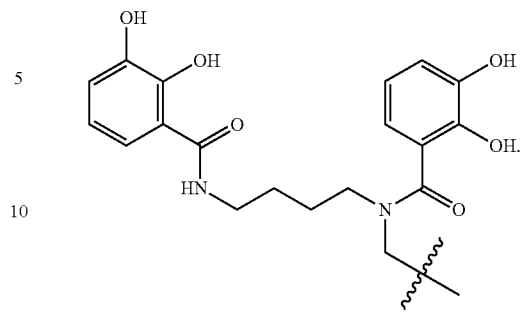

(Sid-5)

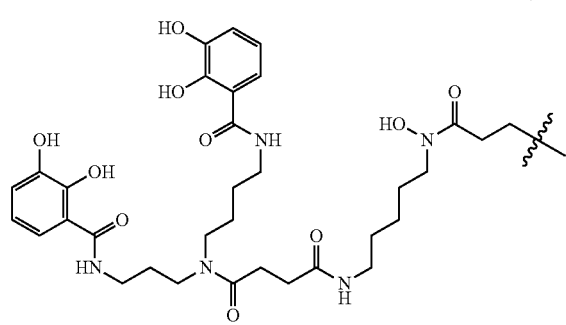

(Sid-7)

Drug is an oxazolidinone antibiotic;
n is 0 or 1; and
m is 0 or 1,
or a pharmaceutically acceptable salt thereof.

16. The compound of claim 1, having a structure of

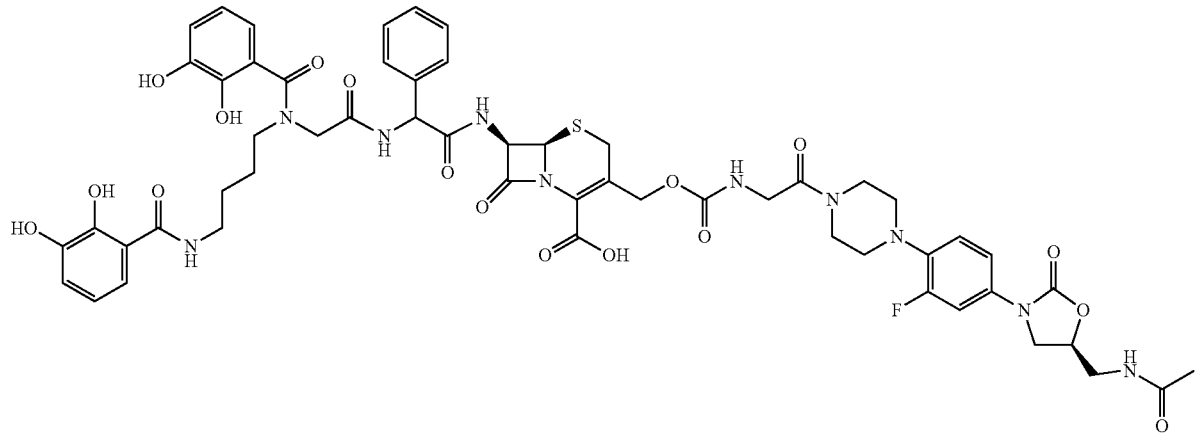 [SMILES: CC(=O)NC[C@H]1CN(c2ccc(N3CCN(C(=O)CNC(=O)OCC4=C(C(=O)O)N5C(=O)[C@@H](NC(=O)C(NC(=O)CN(CCCCNC(=O)c6cccc(O)c6O)C(=O)c6cccc(O)c6O)c6ccccc6)[C@H]5SC4)CC3)c(F)c2)C(=O)O1]

or a pharmaceutically acceptable salt thereof.

17. The compound of claim 1, or a pharmaceutically acceptable salt thereof, wherein Sid is a siderophore moiety 18. A pharmaceutical composition comprising an effective amount of a compound of claim 1, or a pharmaceutically acceptable salt thereof, and a pharmaceutically acceptable carrier.

19. A method of treating bacterial infection, wherein the infection is caused by *Acinetobacter, Pseudomonas*, Enterobacteria, or combinations thereof, comprising administering to a subject infected by a bacterium an effective amount of a compound of claim 1, or a pharmaceutically acceptable salt thereof.

20. The method of claim 19, wherein the bacterium is a Gram-negative bacterium.

21. The method of claim 19, wherein the bacterium is an antibiotic-resistant bacterium.

22. The method of claim 19, wherein the bacterium produces a β-lactamase.

23. The method of claim 19, wherein the infection is caused by *Acinetobacter baumannii*.

24. A method of killing or inhibiting the growth of a bacterium, wherein the bacterium is *Acinetobacter, Pseudomonas*, Enterobacteria, or combinations thereof, comprising contacting the bacterium with an effective amount of a compound of claim 1, or a pharmaceutically acceptable salt thereof.

25. The method of claim 24, wherein the bacterium is a Gram-negative bacterium.

26. The method of claim 24, wherein the bacterium is an antibiotic-resistant bacterium.

27. The method of claim 24, wherein the bacterium produces a β-lactamase.

28. The method of claim 24, wherein the bacterium is by *Acinetobacter baumannii*.

\* \* \* \* \*